(12) United States Patent
Wang et al.

(10) Patent No.: US 12,473,280 B2
(45) Date of Patent: Nov. 18, 2025

(54) SUBSTITUTED TRICYCLIC COMPOUND AS PRMT5 INHIBITOR AND USE THEREOF

(71) Applicant: NANJING SANHOME PHARMACEUTICAL CO., LTD., Jiangsu (CN)

(72) Inventors: Yong Wang, Jiangsu (CN); Liwen Zhao, Jiangsu (CN); Xu Quan, Jiangsu (CN); Guochuang Zheng, Jiangsu (CN); Wei Sun, Jiangsu (CN); Tingting Yang, Jiangsu (CN); Kangning Zhan, Jiangsu (CN); Qiqi Shi, Jiangsu (CN)

(73) Assignee: NANJING SANHOME PHARMACEUTICAL CO., LTD., Jiangsu (CN)

( * ) Notice: Subject to any disclaimer, the term of this patent is extended or adjusted under 35 U.S.C. 154(b) by 880 days.

(21) Appl. No.: 17/768,204

(22) PCT Filed: Oct. 12, 2020

(86) PCT No.: PCT/CN2020/120284
§ 371 (c)(1),
(2) Date: Apr. 11, 2022

(87) PCT Pub. No.: WO2021/068953
PCT Pub. Date: Apr. 15, 2021

(65) Prior Publication Data
US 2024/0116918 A1    Apr. 11, 2024

(30) Foreign Application Priority Data
Oct. 12, 2019  (CN) .......................... 201910969743.2

(51) Int. Cl.
*C07D 471/04* (2006.01)
*A61P 35/00* (2006.01)
(52) U.S. Cl.
CPC ............ *C07D 471/04* (2013.01); *A61P 35/00* (2018.01)
(58) Field of Classification Search
CPC .................................................. C07D 471/04
USPC ....................................................... 514/210
See application file for complete search history.

(56) References Cited

FOREIGN PATENT DOCUMENTS

| CN | 112125886 A | 12/2020 | |
| EP | 4050006 A1 | 8/2022 | |
| JP | 2016-505000 A | 2/2016 | |
| JP | 2016-505001 A | 2/2016 | |
| JP | 2022-554154 A | 12/2022 | |
| WO | 2014/100695 A1 | 6/2014 | |
| WO | 2014/100716 A1 | 6/2014 | |
| WO | WO-2019094311 A1 * | 5/2019 | ............. A61P 35/00 |
| WO | 2019/173804 A1 | 9/2019 | |
| WO | 2020/259478 A1 | 12/2020 | |
| WO | 2021/080359 A1 | 4/2021 | |

OTHER PUBLICATIONS

Extended European Search report dated Nov. 17, 2022, issued in corresponding European Patent Application No. 20873891.4.
International Search Report issued in corresponding International Patent Application No. PCT/CN2020/120284 dated Dec. 31, 2020.

* cited by examiner

*Primary Examiner* — Jeffrey H Murray
*Assistant Examiner* — Rilla Marie Samsell
(74) *Attorney, Agent, or Firm* — Morgan, Lewis & Bockius LLP

(57) ABSTRACT

The present invention belongs to the field of medicinal chemistry and relates to a class of substituted tricyclic compounds as PRMT5 inhibitors and the use thereof. Specifically, the present invention provides a compound represented by formula (A) or an isomer, pharmaceutically acceptable salt, solvate, crystal or prodrug thereof, a preparation method therefor, a pharmaceutical composition containing the compounds, and the use of the compounds or the composition for treating a disease mediated by PRMT5. The compounds of the present invention show significant inhibitory activity on PRMT5.

11 Claims, No Drawings

SUBSTITUTED TRICYCLIC COMPOUND AS PRMT5 INHIBITOR AND USE THEREOF

TECHNICAL FIELD

The present invention belongs to the field of medicinal chemistry, in particular relates to substituted tricyclic compounds, or isomers, pharmaceutically acceptable salts, solvates, crystals or prodrugs thereof, as PRMT5 inhibitors, methods for preparation thereof, and pharmaceutical compositions containing these compounds, and use of these compounds or compositions for the treatment of PRMT5 mediated diseases.

BACKGROUND ART

Modification of DNA plays a central role in triggering gene expression programs at different stages of cell growth and development, with arginine methylation playing an important role in cellular processes including signaling, transcription, RNA processing, DNA recombination and repair. Protein arginine methyltransferases (PRMTs) catalyze the methylation of specific arginine residues by transferring a methyl group from S-adenosylmethionine (SAM) to the guanidine nitrogen of arginine. According to different ways for catalyzing arginine methylation, PRMTs may be divided into three types: type I (PRMT 1, 2, 3, 4, 6 and 8) which catalyzes monomethylation and asymmetrical dimethylation, type II (PRMT5 and PRMT9) which catalyzes monomethylation and symmetrical dimethylation, and type III (PRMT7) which catalyzes only monomethylation.

Among them, PRMT5 specifically binds to methyltransferase complex protein 50 (MEP50), which can symmetrically methylate histones H3 and H4 and regulate the transcription of specific target genomes. Symmetrical dimethylation of histone H3 arginine 8 (R8) and H4R3 catalyzed by PRMT5 has been shown to inhibit the expression of several tumor suppressor genes, such as tumor suppressor gene 7 (ST7), retinoblastoma (RB) tumor suppressor gene family and receptor O-type protein tyrosine phosphatases (PTPROt).

In addition to its ability to methylate histones, PRMT5 is also able to methylate several important transcription factors, allowing it to play an important role in cellular regulation. PRMT5 can methylate p53 and alter its DNA-binding activity, thereby triggering changes in p53-controlled gene expression programs. PRMT5 was also shown to methylate N-MYC and alter its protein stability as well as enhance its oncogenic activity in neuroblastoma. PRMT5 can also directly methylate transcription factors, including E2F-1 and NF-κB/p65, to induce the expression of their target genes. PRMT5 not only can modify nuclear transcription factors, but also can methylate cytoplasmic proteins such as golgin, and ribosomal protein S10 (RPS10). Thus, in addition to its ability to directly regulate its own target genes, PRMT5 is able to indirectly affect global gene expression through symmetrical methylation of key transcription factors, thereby affecting cell growth, proliferation and differentiation.

Numerous studies have demonstrated that PRMT5 is overexpressed in different types of aggressive cancers, including B- and T-cell lymphomas, metastatic melanoma, neuroblastoma and glioblastoma, germ cell tumor, ovarian cancer, nasopharyngeal cancer, breast cancer, colorectal cancer and gastric cancer. Current studies have shown that PRMT5 plays an important role in controlling cell growth and proliferation, and its overexpression promotes cell transformation.

Enhanced PRMT5 expression in cancer cells correlates with transcriptional silencing of its target tumor suppressor genes. PRMT5 is able to promote cancer cell growth by methylation of promoter histones H3R8 and H4R3 and by modifying specific arginine residues of key transcription factors including E2F1 and NF-κB/p65 to cause global chromatin changes. PRMT5 also interacts with programmed cell death 4 (PDCD4), causing it to become methylated at R110 and lose its tumor suppressor activity in MCF-7 cells. Collectively, PRMT5 overexpression may allow its interaction with growth-promoting and tumor suppressor proteins to favor cancer cell growth, survival, and metastasis.

In summary, PRMT5 inhibitors have a clear mechanism in the treatment of tumors and other related diseases, and have great potential to become a new therapy in the field of tumor treatment. Therefore, it is needed to develop safer and more effective PRMT5 inhibitors to meet clinical needs.

SUMMARY OF THE INVENTION

An object of the present invention is to provide a class of compounds with PRMT5 inhibitory activity represented by general formula (A), or isomers, pharmaceutically acceptable salts, solvates, crystals or prodrugs thereof,

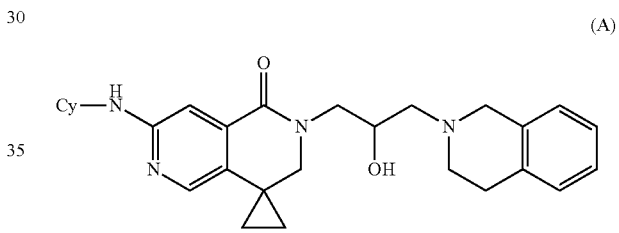

(A)

wherein

Cy is selected from heterocyclyl, which may be substituted by one or more groups selected from the group consisting of halogen, hydroxyl, alkyl, haloalkyl, hydroxyalkyl, alkoxy, haloalkoxy, hydroxyalkoxy, nitro, carboxyl, cyano, amino, monoalkylamino, alkylacylamino, alkylacyl, alkylsulfonyl, aminoacyl, alkylaminoacyl, dialkylamino, alkenyl, alkynyl, haloalkylacyl, hydroxyalkylacyl, cycloalkylacyl, heterocyclylacyl, cycloalkyl, heterocyclyl, aryl, heteroaryl and oxo.

Another object of the present invention is to provide a process for preparing the compound of general formula (A) of the present invention, or an isomer, pharmaceutically acceptable salt, solvate, crystal or prodrug thereof.

A further object of the present invention is to provide a composition comprising the compound of general formula (A) of the present invention, or an isomer, pharmaceutically acceptable salt, solvate, crystal or prodrug thereof and a pharmaceutically acceptable carrier thereof, and a composition comprising the compound of general formula (A) of the present invention, or an isomer, pharmaceutically acceptable salt, solvate, crystal or prodrug thereof, and one or more other drugs.

Still another object of the present invention is to provide a method for treating a PRMT5 mediated disease with the compound of general formula (A) of the present invention, or an isomer, pharmaceutically acceptable salt, solvate, crystal or prodrug thereof, and use of the compound of general formula (A) of the present invention, or an isomer, pharmaceutically acceptable salt, solvate, crystal or prodrug thereof in the preparation of a medicament for the treatment of a PRMT5 mediated disease.

For the above-mentioned objects of the invention, the present invention provides the following technical solutions:

In a first aspect, the present invention provides a compound represented by general formula (A), or an isomer, pharmaceutically acceptable salt, solvate, crystal or prodrug thereof,

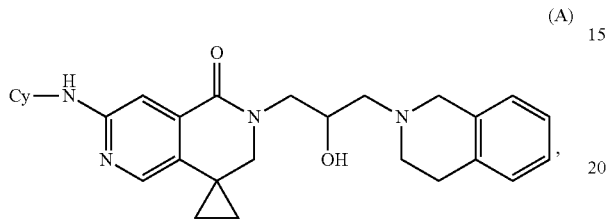

(A)

wherein
Cy is selected from heterocyclyl, which may be substituted by one or more groups selected from the group consisting of halogen, hydroxyl, alkyl, haloalkyl, hydroxyalkyl, alkoxy, haloalkoxy, hydroxyalkoxy, nitro, carboxyl, cyano, amino, monoalkylamino, alkylacylamino, alkylacyl, alkylsulfonyl, aminoacyl, alkylaminoacyl, dialkylamino, alkenyl, alkynyl, haloalkylacyl, hydroxyalkylacyl, cycloalkylacyl, heterocyclylacyl, cycloalkyl, heterocyclyl, aryl, heteroaryl and oxo.

In some preferred embodiments, the compound of the present invention is a compound of general formula (A), or an isomer, pharmaceutically acceptable salt, solvate, crystal or prodrug thereof, wherein:
Cy is selected from 3-12 membered heterocyclyl, which may be substituted by one or more groups selected from the group consisting of halogen, hydroxyl, $C_{1-6}$alkyl, halo$C_{1-6}$alkyl, hydroxy$C_{1-6}$alkyl, $C_{1-6}$alkoxy, halo$C_{1-6}$alkoxy, hydroxy$C_{1-6}$alkoxy, nitro, carboxyl, cyano, amino, mono-$C_{1-6}$alkylamino, $C_{1-6}$alkylacylamino, $C_{1-6}$alkylacyl, $C_{1-6}$alkylsulfonyl, aminoacyl, $C_{1-6}$alkylaminoacyl, di-$C_{1-6}$alkylamino, $C_{2-10}$alkenyl, $C_{2-10}$alkynyl, halo$C_{1-6}$alkylacyl, hydroxy$C_{1-6}$alkylacyl, $C_{3-12}$cycloalkylacyl, 3-12 membered heterocyclylacyl, $C_{3-12}$cycloalkyl, 3-12 membered heterocyclyl, 6-12 membered aryl, 5-12 membered heteroaryl and oxo;
further preferably, Cy is selected from 3-10 membered heterocyclyl, which may be substituted by one or more groups selected from the group consisting of halogen, hydroxyl, $C_{1-3}$alkyl, halo$C_{1-3}$alkyl, hydroxy$C_{1-3}$alkyl, $C_{1-3}$alkoxy, halo$C_{1-3}$alkoxy, hydroxy$C_{1-3}$alkoxy, nitro, carboxyl, cyano, amino, mono-$C_{1-3}$alkylamino, $C_{1-3}$alkylacylamino, $C_{1-3}$alkylacyl, $C_{1-3}$alkylsulfonyl, aminoacyl, $C_{1-3}$alkylaminoacyl, di-$C_{1-3}$alkylamino, $C_{2-6}$alkenyl, $C_{2-6}$alkynyl, halo$C_{1-3}$alkylacyl, hydroxy$C_{1-3}$alkylacyl, $C_{3-8}$cycloalkylacyl, 3-8 membered heterocyclylacyl, $C_{3-8}$cycloalkyl, 3-8 membered heterocyclyl, 6-8 membered aryl, 5-8 membered heteroaryl and oxo;
Still further preferably, Cy is selected from a 3-10 membered heterocyclyl, which further comprises one or more heteroatoms selected from the group consisting of N, O and S, and may be substituted by one or more groups selected from the group consisting of halogen, hydroxyl, $C_{1-3}$alkyl, halo$C_{1-3}$alkyl, hydroxy$C_{1-3}$alkyl, $C_{1-3}$alkoxy, halo$C_{1-3}$alkoxy, hydroxy$C_{1-3}$alkoxy, nitro, carboxyl, cyano, amino, mono-$C_{1-3}$alkylamino, $C_{1-3}$alkylacylamino, $C_{1-3}$alkylacyl, $C_{1-3}$ alkylsulfonyl, aminoacyl, $C_{1-3}$alkylaminoacyl, di-$C_{1-3}$alkylamino, $C_{2-6}$alkenyl, $C_{2-6}$alkynyl, halo$C_{1-3}$alkylacyl, hydroxy$C_{1-3}$alkylacyl, $C_{3-8}$cycloalkylacyl, 3-8 membered heterocyclylacyl, $C_{3-8}$cycloalkyl, 3-8 membered heterocyclyl, 6-8 membered aryl, 5-8 membered heteroaryl and oxo.

In some preferred embodiments, in the compound of general formula (A) according to the present invention, or an isomer, pharmaceutically acceptable salt, solvate, crystal or prodrug thereof, Cy is selected from the group consisting of

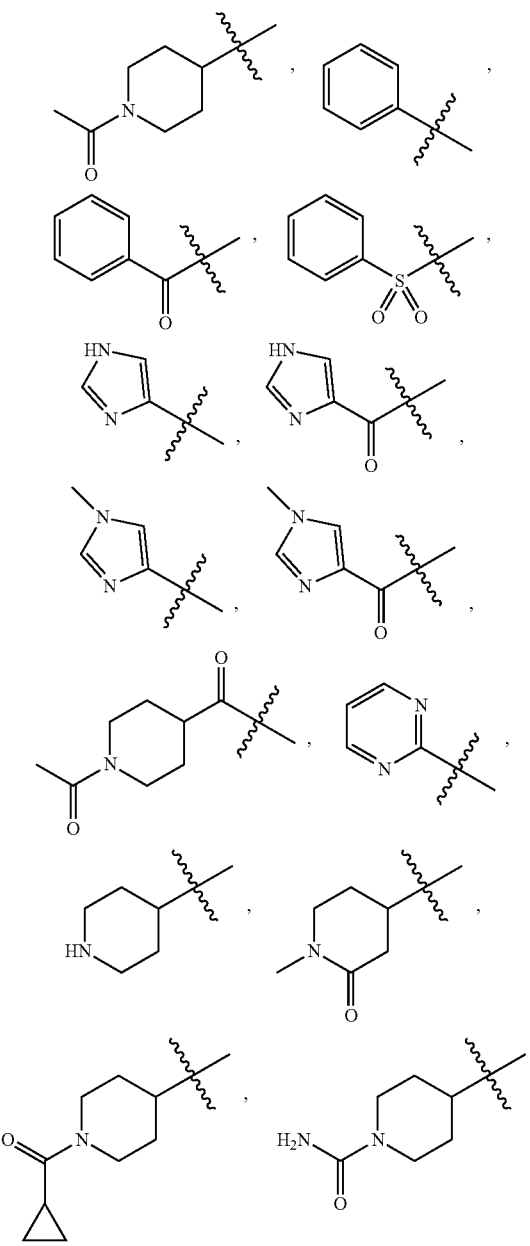

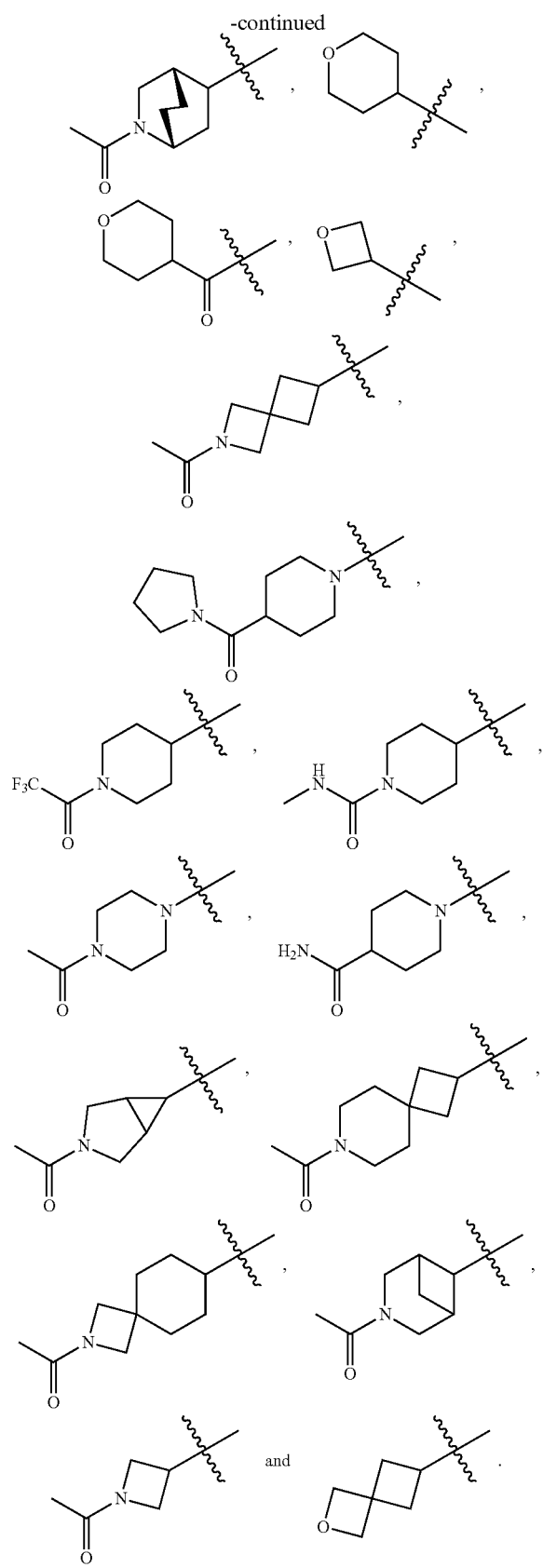

In some preferred embodiments, in the present invention provides a compound of general formula (A), or an isomer, pharmaceutically acceptable salt, solvate, crystal or prodrug thereof, general formula (A) has the structure of the following general formula (I), (I)

wherein
X is selected from the group consisting of O, S, C(R$^1$)(R$^2$) and N(R$^3$), wherein R$^1$, R$^2$ and R$^3$ are each independently selected from the group consisting of hydrogen, halogen, hydroxyl, alkyl, haloalkyl, hydroxyalkyl, alkoxy, haloalkoxy, hydroxyalkoxy, nitro, carboxyl, cyano, amino, monoalkylamino, alkylacylamino, alkylacyl, aminoacyl, alkylaminoacyl, dialkylamino and cycloalkyl, and R$^1$ and R$^2$ together with the carbon atom to which they attach form heterocyclyl, which is optionally substituted by one or more groups selected from the group consisting of halogen, hydroxyl, alkyl, haloalkyl, hydroxyalkyl, alkoxy, haloalkoxy, hydroxyalkoxy, nitro, carboxyl, cyano, amino, monoalkylamino, alkylacylamino, alkylacyl, aminoacyl, alkylaminoacyl, dialkylamino and cycloalkyl;
m is 1, 2, 3 or 4; and
n is 0, 1, 2, 3 or 4.

In some preferred embodiments, the compound of the present invention is a compound of general formula (I), or an isomer, pharmaceutically acceptable salt, solvate, crystal or prodrug thereof, wherein:
R$^1$, R$^2$ and R$^3$ are each independently selected from the group consisting of hydrogen, halogen, hydroxyl, C$_{1-6}$alkyl, haloC$_{1-6}$alkyl, hydroxyC$_{1-6}$alkyl, C$_{1-6}$alkoxy, haloC$_{1-6}$alkoxy, hydroxyC$_{1-6}$alkoxy, nitro, carboxyl, cyano, amino, mono-C$_{1-6}$alkylamino, C$_{1-6}$alkylacylamino, C$_{1-6}$alkylacyl, aminoacyl, C$_{1-6}$alkylaminoacyl, di-C$_{1-6}$alkylamino and C$_{3-12}$cycloalkyl;
further preferably, R$^1$, R$^2$ and R$^3$ are each independently selected from the group consisting of hydrogen, halogen, hydroxyl, C$_{1-3}$alkyl, haloC$_{1-3}$alkyl, hydroxyC$_{1-3}$alkyl, C$_{1-3}$alkoxy, haloC$_{1-3}$alkoxy, hydroxyC$_{1-3}$alkoxy, nitro, carboxyl, cyano, amino, mono-C$_{1-3}$alkylamino, C$_{1-3}$alkylacylamino, C$_{1-3}$alkylacyl, aminoacyl, C$_{1-3}$alkylaminoacyl, di-C$_{1-3}$alkylamino and C$_{3-8}$cycloalkyl;
still further preferably, R$^1$, R$^2$ and R$^3$ are each independently selected from the group consisting of hydrogen, halogen, hydroxyl, methyl, ethyl, propyl, isopropyl, haloC$_{1-3}$alkyl, hydroxyC$_{1-3}$alkyl, C$_{1-3}$alkoxy, haloC$_{1-3}$alkoxy, hydroxyC$_{1-3}$alkoxy, nitro, carboxyl, cyano, amino, mono-C$_{1-3}$alkylamino, C$_{1-3}$alkylacylamino, C$_{1-3}$alkylacyl, aminoacyl, C$_{1-3}$alkylaminoacyl, di-C$_{1-3}$alkylamino and C$_{3-8}$cycloalkyl.

In some preferred embodiments, the compound of the present invention is a compound of general formula (I), or an isomer, pharmaceutically acceptable salt, solvate, crystal or prodrug thereof, wherein:
R$^1$ and R$^2$ together with the carbon atom to which they attach form 3-8 membered heterocyclyl, which further comprises one or more heteroatoms selected from the group consisting of N, O and S, and is optionally substituted by one or more groups selected from the group consisting of halogen, hydroxyl, alkyl, haloalkyl, hydroxyalkyl, alkoxy, haloalkoxy, hydroxyalkoxy, nitro, carboxyl, cyano, amino, monoalkylamino, alkylacylamino, alkylacyl, aminoacyl, alkylaminoacyl, dialkylamino and cycloalkyl;

further preferably, $R^1$ and $R^2$ together with the carbon atom to which they attach form 3-6 membered heterocyclyl, which further comprises one or more heteroatoms selected from the group consisting of N, O and S, and is optionally substituted by one or more groups selected from the group consisting of halogen, hydroxyl, $C_{1-6}$alkyl, halo$C_{1-6}$alkyl, hydroxy$C_{1-6}$alkyl, $C_{1-6}$alkoxy, halo$C_{1-6}$alkoxy, hydroxy$C_{1-6}$alkoxy, nitro, carboxyl, cyano, amino, mono-$C_{1-6}$alkylamino, $C_{1-6}$alkylacylamino, $C_{1-6}$alkylacyl, aminoacyl, $C_{1-6}$alkylaminoacyl, di-$C_{1-6}$alkylamino and $C_{3-12}$cycloalkyl;

still further preferably, $R^1$ and $R^2$ together with the carbon atom to which they attach form aziridinyl, azetidinyl, tetrahydropyrrolyl, piperidinyl, dihydropyrrolyl, tetrahydropyridyl, pyrazolidinyl, dihydropyrazolyl, imidazolidinyl, dihydroimidazolyl, pyrazolyl, dihydropyrazolyl, oxazolidinyl, dihydrooxazolyl, thiazolidinyl, dihydrothiazolyl, isoxazolidinyl, dihydroisoxazolyl, isothiazolidinyl, dihydroisothiazolyl, hexahydropyrimidinyl, tetrahydropyrimidinyl, dihydropyrimidinyl, hexahydropyridazinyl, tetrahydropyridazinyl, dihydropyridazinyl, piperazinyl, tetrahydropyrazinyl, dihydropyrazinyl, morpholinyl, thiomorpholinyl or taurultam, which is optionally substituted by one or more groups selected from the group consisting of halogen, hydroxyl, $C_{1-3}$alkyl, halo$C_{1-3}$alkyl, hydroxy$C_{1-3}$alkyl, $C_{1-3}$alkoxy, halo$C_{1-3}$alkoxy, hydroxy$C_{1-3}$alkoxy, nitro, carboxyl, cyano, amino, mono-$C_{1-3}$alkylamino, $C_{1-3}$alkylacylamino, $C_{1-3}$alkylacyl, aminoacyl, $C_{1-3}$alkylaminoacyl, di-$C_{1-3}$alkylamino and $C_{3-12}$cycloalkyl.

In some preferred embodiments, the present invention provides a compound of general formula (Ia), or an isomer, pharmaceutically acceptable salt, solvate, crystal or prodrug thereof,

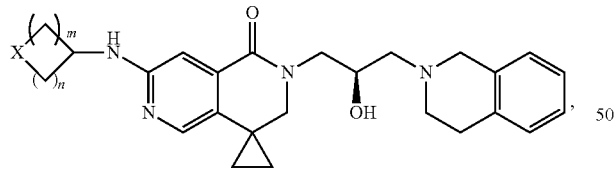

(Ia)

wherein X, m and n have the definitions set forth for general formula (I) above.

In some preferred embodiments, in the compound of general formula (I) or general formula (Ia) according to the present invention, or an isomer, pharmaceutically acceptable salt, solvate, crystal or prodrug thereof,

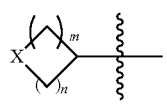

is selected from the group consisting of

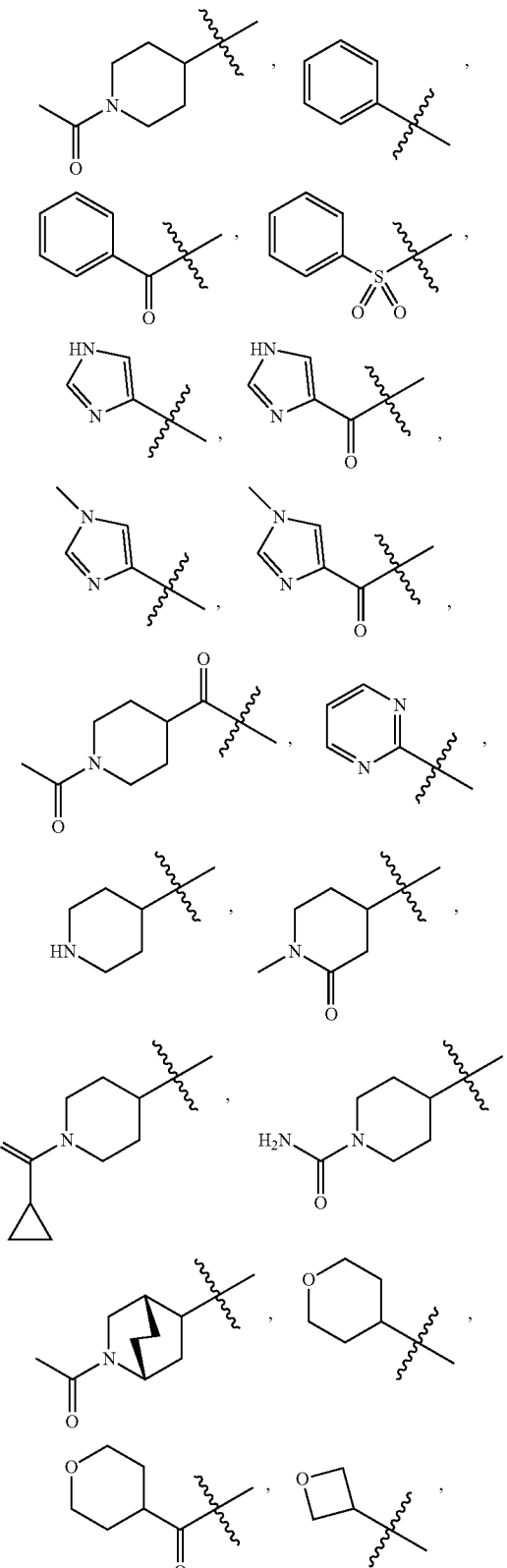

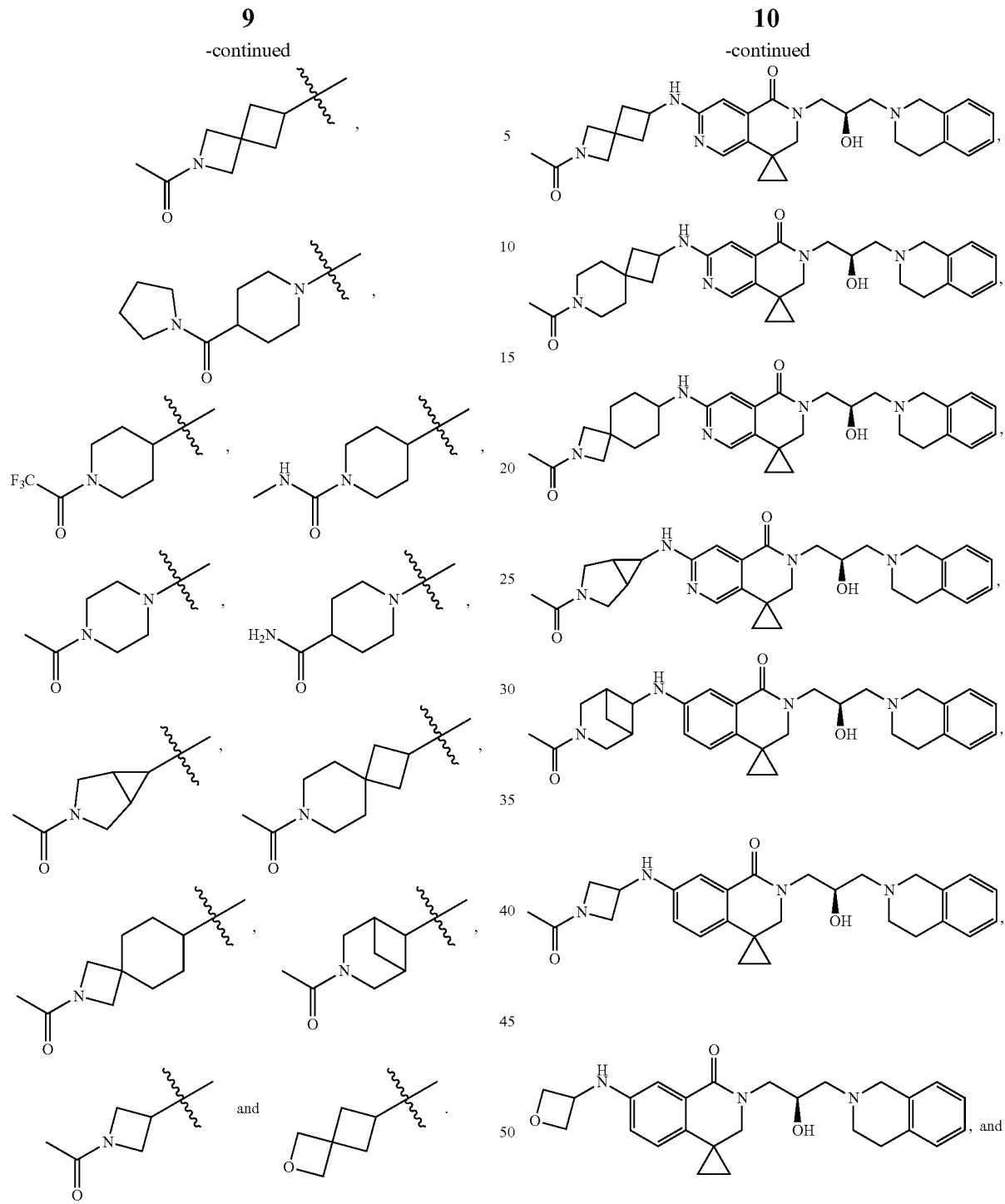

The present invention provides the following specific compounds, or isomers, pharmaceutically acceptable salts, solvates, crystals or prodrugs thereof:

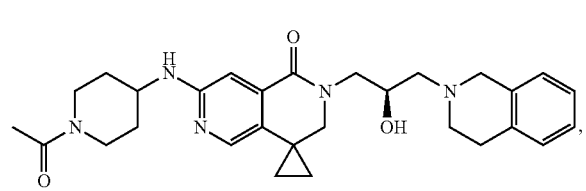

In another aspect, the present invention provides a method for preparing the compound of general formula (A) of the present invention, comprising the step of reacting a compound of formula (1) and a compound of formula (2):

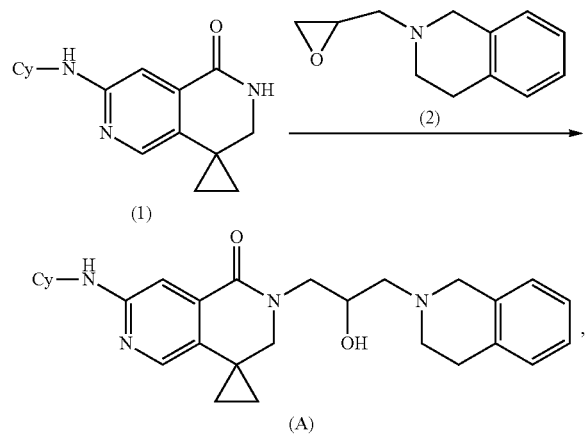

wherein Cy has the definition set forth for general formula (A), and the compound of formula (1) and the compound of formula (2) are commercially available compounds or may be synthesized by other technical means commonly used by those skilled in the art.

In a third aspect, the present invention provides a pharmaceutical composition comprising a compound of the present invention, or an isomer, pharmaceutically acceptable salt, solvate, crystal or prodrug thereof.

In some embodiments, the present invention provides a compound of the present invention, or an isomer, pharmaceutically acceptable salt, solvate, crystal or prodrug thereof, and a pharmaceutical composition comprising a compound of the present invention, or an isomer, pharmaceutically acceptable of salt, solvate, crystal or prodrug thereof, for use in the treatment of a PRMT5 mediated disease.

In some embodiments, the present invention provides a pharmaceutical composition comprising a compound of the present invention, or an isomer, pharmaceutically acceptable salt, solvate, crystal or prodrug thereof, and a pharmaceutically acceptable carrier.

The compound of the present invention, or an isomer, pharmaceutically acceptable salt, solvate, crystal or prodrug thereof, may be mixed with a pharmaceutically acceptable carrier, diluent or excipient to prepare a pharmaceutical formulation suitable for oral or parenteral administration. Methods of administration include, but are not limited to, intradermal, intramuscular, intraperitoneal, intravenous, subcutaneous, intranasal, and oral routes. The formulation may be administered by any route, such as by infusion or bolus injection, by route of absorption through the epithelium or mucocutaneous (e.g., oral mucosa or rectum, etc.). The administration may be systemic or topical. Examples of formulations for oral administration include solid or liquid dosage forms, specifically tablets, pills, granules, powders, capsules, syrups, emulsions, suspensions and the like. The formulation may be prepared by methods known in the art and include a carrier diluent or excipient conventionally used in the art of pharmaceutical formulations.

In a fourth aspect, the present invention provides a method for treating a PRMT5 mediated disease with a compound of the present invention represented by formula (A), formula (I) or (Ia), or an isomer, pharmaceutically acceptable salt, solvate, crystal or prodrug thereof, or a pharmaceutical composition comprising the same, as well as use thereof in the preparation of a medicament for treating a PRMT5 mediated disease.

In some preferred embodiments, the present invention provides a method for treating a PRMT5 mediated disease with a compound of the present invention represented by formula (A), formula (I) or (Ia), or an isomer, pharmaceutically acceptable salt, solvate, crystal or prodrug thereof, or a pharmaceutical composition comprising the same, as well as use thereof in the preparation of a medicament for treating a PRMT5 mediated disease, wherein the PRMT5 mediated disease includes, but is not limited to: proliferative disease, metabolic disease, or blood disease. In some embodiments, the PRMT5 mediated disease described herein is cancer.

In some embodiments, the PRMT5 mediated diseases described herein include, but are not limited to: acoustic neuroma, adenocarcinoma, adrenal cancer, anal cancer, angiosarcoma (e.g., lymphangiosarcoma, lymphatic endothelial sarcoma, angiosarcoma), adnexal carcinoma, benign monoclonal gammopathy, gallbladder cancer (e.g., cholangiocarcinoma), bladder cancer, breast cancer (e.g., breast adenocarcinoma, breast papillocarcinoma, breast cancer, breast medullary carcinoma, triple negative breast cancer), brain cancer (e.g., meningioma; glioma, such as astrocytoma, oligodendroglioma; medulloblastoma), bronchial carcinoma, carcinoid tumor, cervical cancer (e.g., cervical adenocarcinoma), choriocarcinoma, chordoma, craniopharyngioma, colorectal cancer (e.g., colon cancer, rectal cancer, colorectal adenocarcinoma), epithelial cancer, ependymoma, endothelial sarcoma (e.g., Kaposi's sarcoma, multiple idiopathic hemorrhagic sarcoma), endometrial cancer (e.g., uterine cancer, uterine sarcoma), esophageal cancer (e.g., esophageal adenocarcinoma, Barrett's adenocarinoma), Ewing sarcoma, eye cancer (e.g., intraocular melanoma, retinoblastoma), familial eosinophilia, gallbladder cancer, gastric cancer (e.g., gastric adenocarcinoma), gastrointestinal stromal tumor (GIST), head and neck cancer (e.g., head and neck squamous cell carcinoma, oral cancer (e.g., oral squamous cell carcinoma (OSCC), throat cancer (e.g., laryngeal carcinoma, pharyngeal carcinoma, nasopharyngeal carcinoma, oropharyngeal carcinoma)), hematopoietic system cancer (e.g., leukemia, such as acute lymphocytic leukemia (ALL) (e.g., B-cell ALL, T-cell ALL), acute myeloid leukemia (AML) (e.g., B-cell AML, T-cell AML), chronic myelogenous leukemia (CML) (e.g., B-cell CML, T-cell CML), and chronic lymphocytic leukemia (CLL) (e.g., B-cell CLL, T-cell CLL); lymphoma such as Hodgkin lymphoma (HL) (e.g., B-cell HL, T-cell HL) and non-Hodgkin lymphoma (NHL) (e.g., B-cell NHL such as diffuse large cell lymphoma (DLCL) (e.g., diffuse large B-cell lymphoma (DLBCL)), follicular lymphoma, chronic lymphocytic leukemia/small lymphocytic lymphoma (CLL/SLL), mantle cell lymphoma (MCL), marginal zone B-cell lymphoma (e.g., mucosa-associated lymphoid tissue (MALT) lymphoma, nodal marginal zone B-cell lymphoma, splenic marginal zone B-cell lymphoma), primary mediastinal B-cell lymphoma, Burkitt lymphoma, lymphoplasmacytic lymphoma (i.e. "Waldenström's macroglobulinemia"), hairy cell leukemia (HCL), immunoblastic large cell lymphoma, precursor B-lymphoblastic lymphoma, and primary central nervous system (CNS) lymphoma; and T-cell NHL such as precursor T-lymphoblastic lymphoma/leukemia, peripheral T-cell lymphoma (PTCL) (e.g., cutaneous T-cell lymphoma (CTCL) (e.g., mycosis fungiodes, Sezary syndrome), angioimmunoblastic T-cell lymphoma, extranodal natural killer T-cell lymphoma, enteropathy-type T-cell lymphoma, subcutaneous panniculitis-like T-cell lymphoma, anaplastic large cell lymphoma); mixture of one or more leukemias/lymphomas described above; and multiple myeloma (MM)), heavy chain disease (e.g., α chain disease, γ chain disease, μ chain disease), hemangioblastoma, inflammatory myofibroblastic tumor, immune cell amyloidosis, renal cancer (e.g., nephroblastoma, also known as Wilms' tumor, renal cell carcinoma), liver cancer (e.g., hepatocellular carcinoma (HCC), malignant hepatocellular carcinoma), lung cancer (e.g., bronchial carcinoma, small cell lung cancer (SCLC), non-small cell lung cancer (NSCLC), lung adenocarcinoma), leiomyosarcoma (LMS), mastocytosis (e.g., systemic mastocytosis), myelodysplastic syndrome (MDS), mesothelioma, myeloproliferative disorder (MPD) (e.g., polycythemia vera (PV), essential thrombocythemia (ET), agnogenic myeloid metaplasia (AMM), also known as myelofibrosis (MF), chronic idiopathic myelofibrosis, chronic myelogenous leukemia (CML), chronic neutrophilic leukemia (CNL), hypereosinophilic syndrome (HES)), neuroblastoma, neurofibroma (e.g., type 1 or type 2 multiple neurofibroma (NF), Schwannomatosis), neuroendocrine carcinoma (e.g., gastroenteropancreatic neuroendocrine tumor (GEP-NET), carcinoid tumor), osteosarcoma, ovarian cancer (e.g., cystadenocarcinoma, ovarian embryonal carcinoma, ovarian adenocarcinoma, ovarian clear cell carcinoma, ovarian serous cystadenocarcinoma), papillary adenocarcinoma, pancreatic cancer (e.g., pancreatic adenocarcinoma, intraductal papillary mucinous neoplasm (IPMN), pancreatic islet cell tumor), penile cancer (e.g., Paget's disease of penis and scrotum), pineal tumor, primary neuroectodermal tumor (PNT), prostate cancer (e.g., prostate adenocarcinoma), rectal cancer, rhabdomyosarcoma, salivary duct carcinoma, skin cancer (e.g., squamous cell carcinoma (SCC), keratoacanthoma (KA), melanoma, basal cell carcinoma (BCC)), small bowel cancer (e.g., adnexal carcinoma), soft tissue sarcoma (e.g., malignant fibrous histiocytoma (MFH), liposarcoma, malignant peripheral nerve sheath tumor (MPNST), chondrosarcoma, fibrosarcoma, myxosarcoma), sebaceous gland carcinoma, sweat gland carcinoma, synovial tumor, testicular cancer (e.g., spermatogonia cell tumor, testicular embryonal carcinoma), thyroid cancer (e.g., papillary carcinoma of thyroid gland, papillary thyroid cancer (PTC), medullary thyroid cancer), urethral carcinoma, vaginal cancer, and vulvar cancer (e.g., Paget's disease of vulva), medulloblastoma, adenoid cystic carcinoma, melanoma, glioblastoma.

In some embodiments, the PRMT5 mediated diseases described herein include metabolic disorders such as diabetes or obesity.

In some embodiments, the PRMT5 mediated diseases described herein include hemoglobinopathies such as sickle cell disease or β-thalassemia.

In some embodiments, the PRMT5 mediated diseases described herein include inflammatory and autoimmune diseases.

In some preferred embodiments, the present invention provides a method for treating a PRMT5 mediated disease with a compound represented by general formula I of the present invention, or an isomer, a pharmaceutically acceptable salt, solvate, crystal or prodrug thereof, or a pharmaceutical composition comprising the same, and use thereof in the preparation of a medicament for treating a PRMT5 mediated disease, wherein the PRMT5 mediated disease includes, but is not limited to: breast cancer, esophageal cancer, bladder cancer, lung cancer, hematopoietic system cancer, lymphoma, medulloblastoma, rectal adenocarcinoma, colon cancer, gastric cancer, pancreatic cancer, liver cancer, adenoid cystic carcinoma, prostate cancer, lung cancer, head and neck squamous cell carcinoma, brain carcinoma, hepatocellular carcinoma, melanoma, oligodendroglioma, glioblastoma, testicular cancer, ovarian clear cell carcinoma, ovarian serous cystadenocarcinoma, thyroid cancer, multiple myeloma (AML), renal cell carcinoma, mantle cell lymphoma, triple negative breast cancer, non-small cell lung cancer, hemoglobinopathies, diabetes and obesity.

Definition of Terms

Unless stated to the contrary, the terms used in the specification and claims have the following meanings.

"Hydrogen", "carbon" and "oxygen" in the compounds of the present invention include all isotopes thereof. Isotopes are understood to include those atoms having the same atomic number but different mass numbers. For example, isotopes of hydrogen include protium, tritium and deuterium, isotopes of carbon include $^{12}C$, $^{13}C$ and $^{14}C$, and isotopes of oxygen include $^{16}O$ and $^{18}O$, and so on.

"Isomers" in the present invention refer to molecules with the same atomic composition and connection but different three-dimensional spatial arrangements, including but not limited to diastereomers, enantiomers, cis-trans isomers, and mixtures thereof, such as racemic mixtures. Many organic compounds exist in optically active forms, that is, they have the ability to rotate the plane of plane-polarized light. When describing optically active compounds, prefixes D, L or R, S are used to denote the absolute configuration of the chiral center of the molecules. Prefixes D, L or (+), (−) are used to designate the rotation of plane-polarized light by a compound: (−) or L means the compound is levorotatory, and the prefix (+) or D means the compound is dextrorotatory. The chemical structures of these stereoisomers are identical, but their steric structures are different. A specific stereoisomer may be an enantiomer, and a mixture of isomers is often referred to as an enantiomeric mixture. A 50:50 mixture of enantiomers is called a racemic mixture or racemate, which can result in no stereoselectivity or stereospecificity during chemical reactions. The terms "racemic mixture" and "racemate" refer to an equimolar mixture of two enantiomers, having no optical activity.

Depending on the choice of the starting material and the method, the compound of the present invention may be present as one of the possible isomers or as a mixture thereof, such as a racemate and a mixture of diastereomers (depending on the number of asymmetric carbon atoms). Optically active (R)- or (S)-isomers may be prepared using chiral synthons or chiral reagents, or be resolved using conventional techniques.

Any resulting mixture of stereoisomers may be separated into pure or substantially pure geometric isomers, enantiomers, diastereomers based on the difference in the physico-chemical properties of the components, for example, by chromatography and/or fractional crystallization.

"Halogen" in the present invention means fluorine, chlorine, bromine and iodine. "Halo" in the present invention means substitution with fluorine, chlorine, bromine or iodine.

"Alkyl" in the present invention refers to a linear or branched saturated aliphatic hydrocarbon group, preferably a linear or branched group containing 1 to 6 carbon atoms, more preferably a linear or branched group containing 1 to 3 carbon atoms. Non-limiting examples include methyl, ethyl, n-propyl, isopropyl, n-butyl, isobutyl, tert-butyl, sec-butyl, n-pentyl, 1,1-dimethyl propyl, 1,2-dimethylpropyl, 2,2-dimethylpropyl, 1-ethylpropyl, 2-methylbutyl, 3-methylbutyl, n-hexyl, etc. Alkyl may be substituted or unsubstituted, and when substituted, the substituent may be at any available point of attachment.

Both "carbonyl" and "acyl" in the present invention refer to —C(O)—.

"Sulfonyl" in the present invention refers to —S(O)$_2$—.

"Sulfonamido" in the present invention refers to —S(O)$_2$NH—.

"Haloalkyl" in the present invention refers to an alkyl group substituted with at least one halogen.

"Hydroxyalkyl" in the present invention refers to an alkyl group substituted with at least one hydroxyl.

"Alkoxy" in the present invention refers to —O-alkyl. Non-limiting examples of alkoxy include: methoxy, ethoxy, propoxy, n-propoxy, isopropoxy, isobutoxy, sec-butoxy, etc. Alkoxy may be optionally substituted or unsubstituted, and when substituted, the substituent may be at any available point of attachment.

"Cycloalkyl" in the present invention refers to a cyclic saturated hydrocarbon group. A suitable cycloalkyl may be a substituted or unsubstituted monocyclic, bicyclic or tricyclic saturated hydrocarbon group having 3 to 12 carbon atoms, such as cyclopropyl, cyclobutyl, cyclopentyl, cyclohexyl.

"Heterocyclyl" in the present invention refers to a 3-12 membered non-aromatic ring system having 1 to 4 ring heteroatoms, wherein each heteroatom is independently selected from the group consisting of nitrogen, oxygen, sulfur, boron, phosphorus and silicon ("3-12 membered heterocyclyl"). In a heterocyclyl group containing one or more nitrogen atoms, the point of attachment may be a carbon or nitrogen atom, as long as the valence permits. Heterocyclyl may be either monocyclic ("monocyclic heterocyclyl") or fused, bridged, or spiro ring system (e.g., bicyclic system (also known as "bicyclic heterocyclyl")) and may be saturated or partially unsaturated. Suitable heterocyclyl groups include, but are not limited to, piperidinyl, azetidinyl, aziridinyl, tetrahydropyrrolyl, piperazinyl, dihydroquinazolinyl, oxiranyl, oxetanyl, tetrahydrofuranyl, tetrahydropyranyl, etc. Each example of heterocyclyl may be optionally substituted or unsubstituted, and when substituted, the substituent may be at any available point of attachment.

"Aryl" in the present invention refers to a monocyclic or fused polycyclic aromatic system, preferably a monocyclic or a fused bicyclic aromatic system, which contains from 6 to 12 carbon atoms, preferably from about 6 to about 10 carbon atoms. Suitable aryl groups include, but are not limited to, phenyl, naphthyl, anthracenyl, fluorenyl, indanyl. Aryl may be optionally substituted or unsubstituted, and when substituted, the substituent may be at any available point of attachment.

"Heteroaryl" in the present invention refers to an aryl group having at least one carbon atom being replaced by a heteroatom, preferably composed of 5-12 atoms (5-12 membered heteroaryl), more preferably composed of 5-10 atoms (5-10 membered heteroaryl), the heteroatom being O, S or N. The heteroaryl group includes, but is not limited to, imidazolyl, pyrrolyl, furyl, thienyl, pyrazolyl, oxazolyl, thiazolyl, isoxazolyl, isothiazolyl, oxadiazolyl, triazolyl, tetrazolyl, indolyl, pyridyl, pyrimidinyl, pyridazinyl, pyrazinyl, triazinyl, isoindolyl, benzopyrazolyl, benzimidazolyl, benzofuranyl, benzopyranyl, benzothienyl, benzoxazolyl, benzothiazolyl, benzisoxazolyl, benzisothiazolyl, quinolinyl, isoquinolinyl, quinazolinyl, cinnolinyl, quinoxalinyl, benzoxazinyl, benzothiazinyl, imidazopyridyl, pyrimidopyrazolyl, pyrimidoimidazolyl, etc. Heteroaryl may be optionally substituted or unsubstituted, and when substituted, the substituent may be at any available point of attachment.

A "pharmaceutically acceptable salt" in the present invention refers to a salt of the compound of the present invention, which is safe and effective, and has desired biological activity when used in a mammal.

A "solvate" in the present invention refers in the conventional sense to a complex formed by a combination of a solute (e.g., active compound, salt of an active compound) and a solvent (e.g., water). The solvent refers to a solvent known or readily determined by a person skilled in the art. If it is water, the solvate is often referred to as a hydrate, e.g., hemihydrate, monohydrate, dihydrate, trihydrate, or an alternative amount thereof, or the like.

The in vivo effect of a compound of formula (A) may be exerted in part by one or more metabolites formed in human or animals following administration thereof. As described above, the in vivo effect of a compound of formula (A) may also be exerted via the metabolism of a precursor compound ("prodrug"). A "prodrug" in the present invention refers to a compound that is converted to a compound of the present invention due to reaction with an enzyme, gastric acid, etc. under physiological conditions in a living body, that is, a compound that is converted to a compound of the present invention through enzymatic oxidation, reduction, hydrolysis, etc. and/or a compound that is converted to a compound of the present invention through a hydrolysis reaction by gastric acid or the like.

A "crystal" in the present invention refers to a solid whose internal structure is formed by regularly repeated constituent atoms (or groups thereof) in three dimensions, which is different from an amorphous solid which does not have such a regular internal structure.

A "pharmaceutical composition" in the present invention refers to a mixture comprising any one of the compounds described herein, including the corresponding isomer, prodrug, solvate, pharmaceutically acceptable salt or chemically protected form thereof, and one or more pharmaceutically acceptable carriers and/or one or more other drugs. The purpose of a pharmaceutical composition is to facilitate the

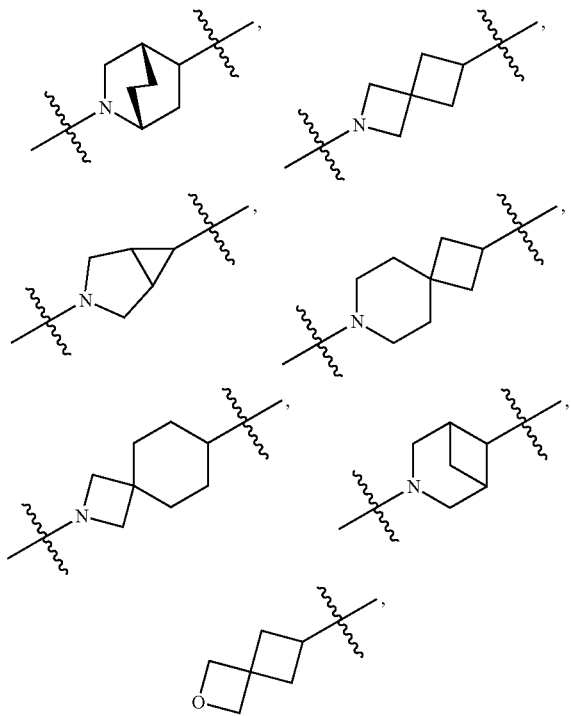

administration of the compound to an organism. The composition is typically used in the manufacture of a medicament for the treatment and/or prevention of a disease mediated by one or more kinases.

A "pharmaceutically acceptable carrier" in the present invention refers to a carrier that does not cause significant irritation to the organism and does not interfere with the biological activity and property of the administered compound, including all solvents, diluents or other excipients, dispersing agents, surface active agents, isotonic agents, thickeners or emulsifiers, preservatives, solid binders, lubricants, etc., unless any conventional carrier medium is incompatible with the compound of the present invention. Some examples of the pharmaceutically acceptable carrier include, but are not limited to, carbohydrates, such as lactose, glucose, and sucrose; starches, such as corn starch and potato starch; cellulose and its derivatives, such as sodium carboxymethylcellulose, and cellulose and cellulose acetate; malt, gelatin, etc.

An "excipient" in the present invention refers to an inert substance added to a pharmaceutical composition to further facilitate the administration of the compound. Excipients may include calcium carbonate, calcium phosphate, various sugars and various types of starch, cellulose derivatives, gelatin, vegetable oils, polyethylene glycol.

"PRMT5" in the invention may be wild-type PRMT5 or any mutant or variant of PRMT5 that contains one or more mutations (e.g., conservative substitutions).

DETAILED DESCRIPTION

The present invention will be described below in further detail in conjunction with the examples, but the present invention is not limited to these examples. The materials used in the following examples were obtained commercially unless otherwise specified.

Example 1: (R)-7'-((1-acetylpiperidin-4-yl)amino)-2'-(3-(3,4-dihydroisoquinolin-2(1H)-yl)-2-hydroxypropyl)-2',3'-dihydro-1'H-spiro[cyclopropane-1,4'-[2,6]naphthyridin]-1'-one

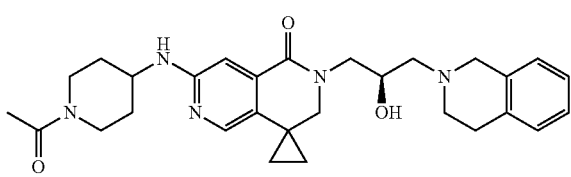 [SMILES: CC(=O)N1CCC(Nc2cc3c(cn2)C2(CC2)CN(C[C@H](O)CN2CCc4ccccc4C2)C3=O)CC1]

Step 1: Preparation of methyl 5-bromo-2-chloroisonicotinate

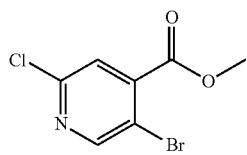

5-Bromo-2-chloroisonicotinic acid (10 g, 42.292 mmol) was dissolved in methanol. 9.2 mL of thionyl chloride (9.2 mL, 126.8 mmol) was added at 0° C. After the dropwise addition, the reaction solution was heated to 80° C. After reacting for 10 hours, the reaction was complete as monitored by LCMS. Ethyl acetate (200 mL) was added. Saturated aqueous sodium carbonate solution was added to adjusted pH to about 8. After separating the organic phase and the aqueous phase, the aqueous phase was extracted three times with ethyl acetate. The combined organic phase was washed once with saturated sodium chloride, dried over anhydrous sodium sulfate, and concentrated to give the title compound. LC-MS m/z: [M+H]$^+$=250.0, 252.0.

Step 2: Preparation of methyl 2-chloro-5-methylisonicotinate

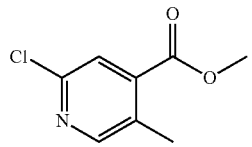

Methyl 5-bromo-2-chloroisonicotinate (10 g, 51.8 mmol) and tetrakis(triphenylphosphine) palladium (4.6 g, 3.98 mmol) were added to anhydrous N,N-dimethylformamide (DMF, 25 mL). Trimethylaluminum (2 M toluene solution, 51.9 mmol, 25.95 mL) was added under argon protection. After the addition was finished, the reaction system was heated to 80° C. and stirred overnight. After the reaction was complete, the reaction solution was poured into ice water (500 mL) to quench. Ethyl acetate (500 mL) was added for extraction. The organic phase was washed with saturated aqueous sodium chloride solution, dried over anhydrous sodium sulfate, and evaporated under reduced pressure to remove the solvent. The residue was subjected to column chromatography to give the title compound. LC-MS m/z: [M+H]$^+$=186.0.

Step 3: Preparation of methyl 5-(bromomethyl)-2-chloroisonicotinate

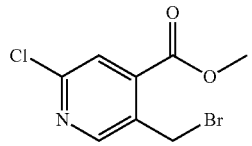

Methyl 2-chloro-5-methylisonicotinate (5.14 g, 27.69 mmol) was dissolved in carbon tetrachloride (50 mL). N-bromosuccinimide (4.93 g, 27.7 mmol) and benzoyl peroxide (1 g, 4.13 mmol) were added. The reaction was stirred at 80° C. overnight. After the reaction was complete as monitored by LCMS, the organic solvent was removed under reduced pressure. Water and ethyl acetate were added for extraction. The organic phase was washed twice with saturated sodium chloride, dried over anhydrous sodium sulfate, and separated by column chromatography to give the title compound. LC-MS m/z: [M+H]$^+$=264.0, 266.1.

Step 4: Preparation of methyl 2-chloro-5-(cyanomethyl)isonicotinate

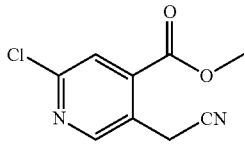

Methyl 5-(bromomethyl)-2-chloroisonicotinate (5.29 g, 20.1 mmol) was dissolved in anhydrous acetonitrile (35 mL). Trimethylsilyl cyanide (2.20 g, 22.17 mmol) was added. The temperature was lowered to −10° C. Tetrabutylammonium fluoride (7.88 g, 30.14 mmol) was slowly added dropwise to the reaction solution. After the dropwise addition was finished, the temperature was raised to 0° C. and the reaction was carried out for 3 hours. After the reaction was complete as monitored by LCMS, the reaction solution was suction filtered through celite, followed by addition of water. The mixture was extracted with ethyl acetate. The organic phase was washed twice with saturated sodium chloride, dried over anhydrous sodium sulfate, and separated by column chromatography to give the title compound. LC-MS m/z: [M+H]$^+$=211.0.

Step 5: Preparation of methyl 2-chloro-5-(1-cyanocyclopropyl)isonicotinate

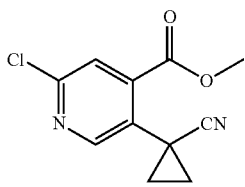 [SMILES: COC(=O)c1cc(Cl)ncc1C1(C#N)CC1]

Methyl 2-chloro-5-(cyanomethyl)isonicotinate (1.5 g, 7.12 mmol) was dissolved in anhydrous dimethyl sulfoxide (DMSO, 25 mL). 1,2-Dibromoethane (2.0 g, 10.65 mmol) and cesium carbonate (4.64 g, 14.24 mmol) were added. The reaction was carried out under N$_2$ protection at 70° C. for 1 hour. After the reaction was complete as monitored by LCMS, the mixture was cooled to room temperature, and water was added. The mixture was extracted with ethyl acetate. The organic layer was washed twice with saturated sodium chloride, dried over anhydrous sodium sulfate, and separated by column chromatography to give the title compound. LC-MS m/z: [M+H]$^+$=237.0.

Step 6: Preparation of methyl 2-((1-(tert-butoxycarbonyl)piperidin-4-yl)amino)-5-(1-cyanocyclopropyl)isonicotinate

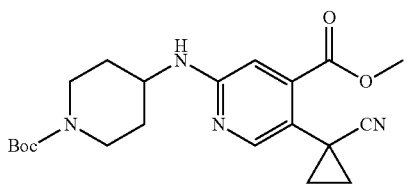 [SMILES: COC(=O)c1cc(NC2CCN(C(=O)OC(C)(C)C)CC2)ncc1C1(C#N)CC1]

Methyl 2-chloro-5-(1-cyanocyclopropyl)isonicotinate (0.1 g, 0.38 mmol) was dissolved in dry tetrahydrofuran (THF, 3 mL). Tert-butyl 4-aminopiperidine-1-carboxylate (114.1 mg, 0.57 mmol), cesium carbonate (247.6 mg, 0.76 mmol), and chloro(2-dicyclohexylphosphino-2',6'-diisopropyl-1,1'-biphenyl)[2-(2-aminoethylphenyl]palladium(II) (31.82 mg, 0.04 mmol) were added. The reaction was carried out under N$_2$ protection at 70° C. overnight. After the reaction was complete as monitored by LCMS, water was added. The mixture was extracted with ethyl acetate. The organic phase was washed twice with saturated sodium chloride, dried over anhydrous sodium sulfate, and separated by column chromatography to give the title compound. LC-MS m/z: [M+H]$^+$=401.2.

Step 7: Preparation of methyl 2-((1-acetylpiperidin-4-yl)amino)-5-(1-cyanocyclopropyl)isonicotinate

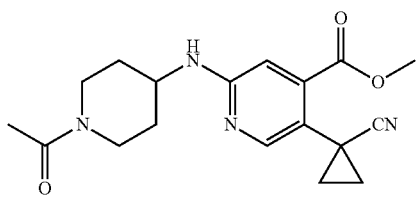 [SMILES: COC(=O)c1cc(NC2CCN(C(C)=O)CC2)ncc1C1(C#N)CC1]

Methyl 2-((1-(tert-butoxycarbonyl)piperidin-4-yl)amino)-5-(1-cyanocyclopropyisonicotinate (162 mg, 0.405 mmol) was dissolved in anhydrous dichloromethane (4 mL), and cooled to 0° C. in an ice bath. Trifluoroacetic acid (0.4 mL, 5.38 mmol) was slowly added dropwise. After the dropwise addition was finished, the ice bath was removed, and the mixture was stirred at room temperature overnight. After the organic solvent was evaporated out under reduced pressure, anhydrous dichloromethane (5 mL) was added. N,N-diisopropylethylamine was added to the solution until the pH was 7-8, then additional N,N-diisopropylethylamine (52.3 mg, 0.405 mmol) was added, and acetic anhydride (49.0 mg, 0.48 mmol) was added. The mixture was stirred at room temperature for 2 hours. After the reaction was complete as monitored by LCMS, the reaction solution was quenched by adding water, and extracted with dichloromethane. The organic phase was washed twice with saturated sodium chloride, dried over anhydrous sodium sulfate, and concentrated to give the title compound. LC-MS m/z: [M+H]$^+$=343.2.

Step 8: Preparation of 7'-((1-acetylpiperidin-4-yl)amino)-2',3'-dihydro-1'H-spiro[cyclopropane-1,4'-[2,6]naphthyridin]-1'-one

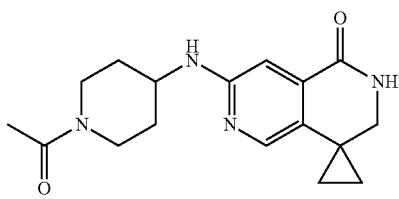 [SMILES: CC(=O)N1CCC(Nc2cc3c(cn2)C2(CC2)CNC3=O)CC1]

Methyl 2-((1-acetylpiperidin-4-yl)amino)-5-(1-cyanocyclopropyl)isonicotinate (311.0 mg, 0.91 mmol) was dissolved in methanol and cooled to 0° C. in an ice bath. Cobalt dichloride hexahydrate (865.4 mg, 3.64 mmol) was added. Sodium borohydride (207.26 mg, 5.48 mmol) was slowly added in portions. The mixture was stirred at 0° C. for 0.5 hours and then at room temperature for 1 hour. The reaction was not complete as monitored by LCMS. The reaction solution was quenched by adding saturated aqueous ammonium chloride solution, and extracted with ethyl acetate. The organic phase was washed twice with saturated sodium chloride, dried over anhydrous sodium sulfate, and separated by column chromatography to give the title compound. LC-MS m/z: [M+H]$^+$=315.2.

Step 9: Preparation of (R)-7'-((1-acetylpiperidin-4-yl)amino)-2'-(3-(3,4-dihydroisoquinolin-2(1H)-yl)-2-hydroxypropyl)-2',3'-dihydro-1'H- spiro[cyclopropane-1,4-[2,6]naphthyridin]-1-one

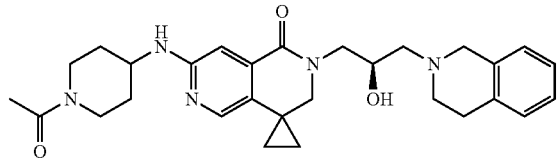 [SMILES: CC(=O)N1CCC(Nc2cc3c(cn2)C2(CC2)CN(C[C@H](O)CN2CCc4ccccc4C2)C3=O)CC1]

7'-((1-Acetylpiperidin-4-yl)amino)-2',3'-dihydro-1'H-spiro[cyclopropane-1,4'-[2,6]naphthyridin]-1'-one (45 mg, 0.175 mmol) was dissolved in anhydrous DMF (5 mL), and cooled to 0° C. under nitrogen protection. NaH (11.45 mg, 0.48 mmol) was added slowly. After 0.5 hours, (R)-2-(oxiran-2-ylmethyl)-1,2,3,4-tetrahydroisoquinoline (32.53 mg, 0.172 mmol) was added, and the mixture was stirred at room temperature overnight. The reaction was not complete as monitored by LCMS. 10 mg of NaH and 33 mg of (R)-2-(oxiran-2-ylmethyl)-1,2,3,4-tetrahydroisoquinoline were further added, and the reaction was continued for 2 hours. The reaction was complete as monitored by LCMS. The organic solvent was evaporated under reduced pressure, and the residue was subjected to column chromatography to give the title compound. $^1$H NMR (400 MHz, DMSO-d$_6$) δ8.12-8.23 (m, 1H), 7.10-7.16 (m, 4H), 6.65-6.80 (m, 1H), 5.50-5.60 (m, 1H), 4.72 (s, 1H), 4.12-4.25 (m, 1H), 3.94-4.10 (m, 1H), 3.71-3.87 (m, 2H), 3.62 (s, 2H), 3.42-3.54 (m, 2H), 3.36-3.41 (m, 1H), 3.11-3.25 (m, 2H), 2.75-2.94 (m, 3H), 2.65-2.80 (m, 2H), 2.36-2.48 (m, 2H), 2.05 (s, 3H), 1.80-2.00 (m, 2H), 1.15-1.36 (m, 2H), 0.80-0.97 (m, 4H). LC-MS m/z: [M+H]$^+$=504.3.

Example 2: (R)-7'-((2-acetyl-2-azaspiro[3.3]hept-6-yl)amino)-2'-(3-(3,4-dihydroisoquinolin-2(1H)-yl)-2-hydroxypropyl)-2',3'-dihydro-1'H-spiro[cyclopropane-1,4'-[2,6]naphthyridin]-1-one

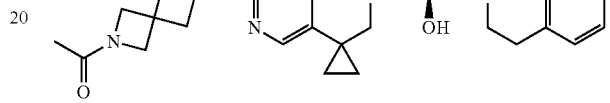

The preparation method was the same as the preparation method of Example 1, except that tert-butyl 4-aminopiperidine-1-carboxylate in step 6 of Example 1 was replaced with tert-butyl 6-amino-2-azaspiro[3.3]heptane-2-carboxylate to give the title compound. $^1$H NMR (400 MHz, DMSO-d$_6$) δ7.71 (s, 1H), 7.00-7.15 (m, 4H), 6.87 (m, 1H), 4.78 (s, 1H), 4.16 (s, 1H), 4.04-4.10 (m, 3H), 3.88 (m, 1H), 3.70-3.80 (m, 3H), 3.61-3.63 (m, 2H), 2.80-2.83 (m, 2H), 2.70-2.72 (m, 2H), 2.18-2.20 (m, 1H), 1.98-2.02 (m, 4H), 1.72 (s, 3H), 1.24-1.30 (m, 4H), 0.94-1.0 (m, 4H). LC-MS m/z: [M+H]$^+$=516.3.

Following the synthetic method of Example 1 of the present invention, the compounds of Examples 3-9 were synthesized using different commercially available raw materials, and the characterization parameters of these compounds are shown in Table 1:

TABLE 1

| Examples | Structures of the compounds | LC-MS m/z: [M + H]$^+$ |
|---|---|---|
| 3 | | 544.3 |
| 4 | | 544.3 |

TABLE 1-continued

| Examples | Structures of the compounds | LC-MS m/z: [M + H]+ |
|---|---|---|
| 5 | | 502.3 |
| 6 | | 516.3 |
| 7 | | 476.3 |
| 8 | | 435.3 |
| 9 | | 475.3 |

Example 10: (R)-7'-((2-Acetyl-2-azaspiro[3.3]hept-6-yl)amino)-2'-(3-(3,4-dihydroisoquinolin-2(1H)-yl)-2-hydroxypropyl)-2',3'-dihydro-1'H-spiro[cyclopropane-1,4'-isoquinolin]-1'-one Step 1: Preparation of methyl 2-(1-cyanocyclopropyl)benzoate Sodium hydride (4.46 g, 111 mmol) was placed in a three-neck flask. 20 mL of anhydrous N,N-dimethylformamide was added at 0° C., and stirred for 5 min. Methyl 2-(cyanomethyl)benzoate (7.80 g, 44.6 mmol) in N,N-dimethylformamide (80 mL) was slowly added. The mixture was stirred at 0° C. for 30 min. 1,2-Dibromoethane (10.0 g, 53.5 mmol) was then slowly added dropwise. After the dropwise addition was finished, the mixture was moved to room temperature to react for 2 h. After the reaction was complete, it was quenched by addition of 20 mL of saturated ammonium chloride solution. The mixture was extracted with ethyl acetate (30 mL×3). The combined organic phase was washed with water (10 mL×2) and saturated brine, and dried over anhydrous sodium sulfate. The solvent was evaporated under reduced pressure and the residue was subjected to column chromatography to give the title compound. LC-MS m/z: [M+H]$^+$=202.

Step 2: Preparation of 2',3'-dihydro-1'H-spiro[cyclopropane-1,4'-isoquinolin]-1'-one

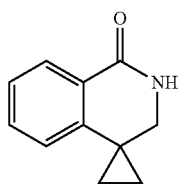 [SMILES: O=C1NCC2(CC2)c2ccccc21]

Methyl 2-(1-cyanocyclopropyl)benzoate (13.3 g, 66.1 mmol) was dissolved in 150 mL of absolute ethanol. Cobalt chloride hexahydrate (31.5 g, 132 mmol) was added. Sodium borohydride (7.54 g, 198 mmol) was added in portions at 0° C. The mixture was moved to room temperature and reacted for 1 h and then reacted at 80° C. for 2 h. After the reaction was complete, the mixture was suction filtered. The filtrate was evaporated under reduced pressure to remove the solvent, and the residue was subjected to column chromatography to give the title compound. LC-MS m/z: [M+H]$^+$=174.

Step 3: Preparation of 7'-nitro-2',3'-dihydro-1'H-spiro[cyclopropane-1,4'-isoquinolin]-1'-one

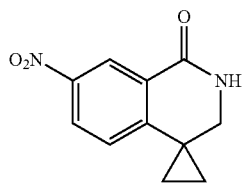 [SMILES: O=C1NCC2(CC2)c2ccc([N+](=O)[O-])cc21]

2',3'-Dihydro-1'H-spiro[cyclopropane-1,4'-isoquinolin]-1'-one (6.33 g, 36.6 mmol) was dissolved in concentrated sulfuric acid (30 mL) cooled in an ice bath. Potassium nitrate (3.69 g, 36.6 mmol) was added in portions at −10° C. The mixture was moved to room temperature and reacted for 1 h. After the reaction was complete, the mixture was poured into ice water. A solid was precipitated. The mixture was suction filtered, and the filter cake was dried to give the title compound. LC-MS m/z: [M+H]$^+$=219.

Step 4: Preparation of (R)-2'-(3-(3,4-dihydroisoquinolin-2(1H)-yl)-2-hydroxypropyl)-7'-nitro-2',3'-dihydro-1'H-spiro[cyclopropane-1,4'-isoquinolin]-1'-one

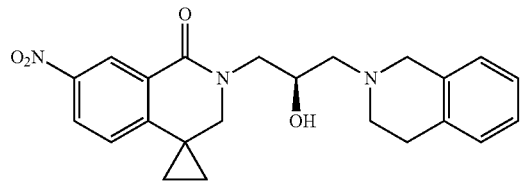 [SMILES: O=C1c2cc([N+](=O)[O-])ccc2C2(CC2)CN1C[C@H](O)CN1CCc2ccccc2C1]

7'-Nitro-2',3'-dihydro-1'H-spiro[cyclopropane-1,4'-isoquinolin]-1'-one (300 mg, 1.38 mmol) was dissolved in 10 mL DMSO. Cesium carbonate (900 mg, 2.75 mmol) was added, and then the mixture was stirred at room temperature for 0.5 h. (R)-2-(Oxiran-2-ylmethyl)-1,2,3,4-tetrahydroisoquinoline (520 mg, 2.75 mmol) was added. The reaction was carried out at 100° C. for 3 h. After the reaction was complete, 50 mL of water was added, and the mixture was extracted with ethyl acetate (30 mL×3). The organic phase was dried over anhydrous sodium sulfate, evaporated under reduced pressure to remove the solvent, and the residue was subjected to column chromatography to give the title compound. LC-MS m/z: [M+H]$^+$=408.

Step 5: Preparation of (R)-7'-amino-2'-(3-(3,4-dihydroisoquinolin-2(1H)-yl)-2-hydroxypropyl)-2',3'-dihydro-1'H-spiro[cyclopropane-1,4'-isoquinolin]-1'-one

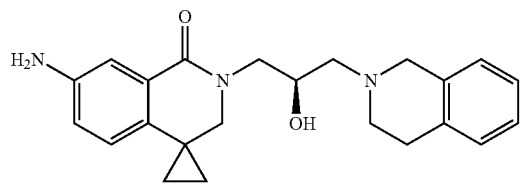

(R)-2'-(3-(3,4-dihydroisoquinolin-2(1H)-yl)-2-hydroxypropyl)-7'-nitro-2',3'-dihydrogen-1'H-spiro[cyclopropane-1,4'-isoquinolin]-1'-one (500 mg, 1.23 mmol), reduced iron powder (274 mg, 4.9 mmol), and ammonium chloride (260 mg, 4.90 mmol) were added into a mixed solution of 10 mL of ethanol and 2 mL of water, and reacted at 75° C. for 2 h. After the reaction was complete, the mixture was filtered, and the filtrate was evaporated under reduced pressure to remove the solvent. 20 mL of dichloromethane was added, and the mixture was filtered. The filtrate was evaporated under reduced pressure to remove the solvent, to give the title compound. LC-MS m/z: [M+H]$^+$=378.

Step 6: Preparation of tert-butyl (R)-6-((2'-(3-(3,4-dihydroisoquinolin-2(1H)-yl)-2-hydroxypropyl)-1'-oxo-2',3'-dihydro-1'H-spiro[cyclopropane-1,4'-isoquinolin]-7'-yl)amino)-2-azaspiro[3.3]heptane-2-carboxylate

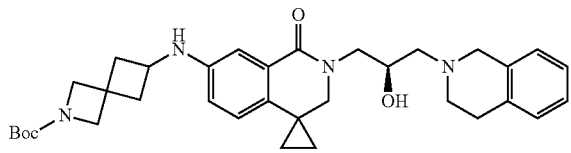 [SMILES: CC(C)(C)OC(=O)N1CC2(CC(Nc3ccc4c(c3)C(=O)N(C[C@H](O)CN3CCc5ccccc5C3)CC43CC3)C2)C1]

(R)-7'-Amino-2'-(3-(3,4-dihydroisoquinolin-2(1H)-yl)-2-hydroxypropyl)-2',3'-dihydro-1'H-spiro[cyclopropane-1,4'-isoquinolin]-1'-one (200 mg, 0.526 mmol) and tert-butyl 6-oxo-2-azaspiro[3.3]heptane-2-carboxylate (65.06 mg, 0.582 mmol) were dissolved in 5 mL of methanol. A drop of glacial acetic acid was added. The mixture was stirred at room temperature for 0.5 h. Pyridine borane (74.0 mg, 0.796 mmol) was added dropwise in an ice bath, and the mixture was stirred at room temperature for 0.5 h. After the reaction was complete, the solvent was evaporated under reduced pressure, and the residue was subjected to column chromatography to give the title compound. LC-MS m/z: [M+H]$^+$=573.

Step 7: Preparation of (R)-7'-((2-azaspiro[3.3]hept-6-yl)amino)-2'-(3-(3,4-dihydro isoquinoline-2(1H)-yl)-2-hydroxypropyl)-2',3'-dihydro-1'H-spiro[cyclopropane-1,4'-isoquinolin]-1'-one

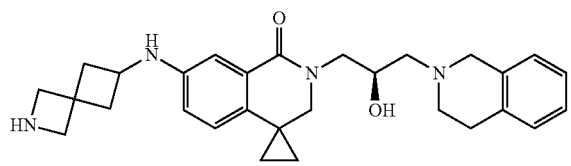 [SMILES: O=C1c2cc(NC3CC4(CNC4)C3)ccc2C2(CC2)CN1C[C@H](O)CN1CCc2ccccc2C1]

Tert-butyl (R)-6-((2'-(3-(3,4-dihydroisoquinolin-2(1H)-yl)-2-hydroxypropyl)-1'-oxo-2',3'-dihydro-1'H-spiro[cyclopropane-1,4'-isoquinolin]-7'-yl)amino)-2-azaspiro[3.3]heptane-2-carboxylate (180 mg, 0.315 mmol) was dissolved in 10 mL of hydrogen chloride methanol (4.0 mol/L) solution, and stirred at room temperature for 0.5 h. After the reaction was complete, the solvent was evaporated under reduced pressure to give the title compound. LC-MS m/z: [M+H]$^+$=473.

Step 8: Preparation of (R)-7'-((2-acetyl-2-azaspiro[3.3]hept-6-yl)amino)-2'-(3-(3,4-dihydroisoquinolin-2(1H)-yl)-2-hydroxypropyl)-2',3'-dihydro-1'H-spiro[cyclopropane-1,4'-isoquinolin]-1'-one

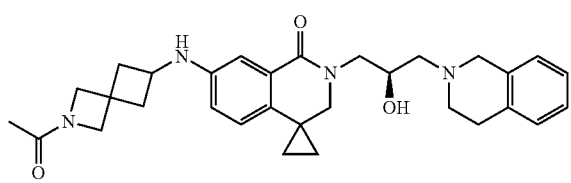 [SMILES: CC(=O)N1CC2(CC(Nc3ccc4c(c3)C(=O)N(C[C@H](O)CN3CCc5ccccc5C3)CC43CC3)C2)C1]

(R)-7'-((2-Azaspiro[3.3]hept-6-yl)amino)-2'-(3-(3,4-dihydroisoquinolin-2(1H)-yl)-2-hydroxypropyl)-2',3'-dihydro-1'H-spiro[cyclopropane-1,4'-isoquinolin]-1'-one (140 mg, 0.297 mmol) was added into 10 mL of dichloromethane. Triethylamine was added until the solution became weakly basic. After complete dissolution, acetic anhydride (61.0 mg, 0.593 mmol) was added, and the mixture was stirred at room temperature for 15 min. After the reaction was complete, the solvent was evaporated under reduced pressure, and the residue was subjected to column chromatography to give the title compound. $^1$H NMR (400 MHz, MeOD) δ7.74 (s, 1H), 7.31 (m, 1H), 7.14-7.12 (m, 4H), 7.06-7.00 (m, 1H), 4.25-4.23 (m, 1H), 4.05-3.83 (m, 5H), 3.70-3.61 (m, 2H), 3.45-3.37 (m, 2H), 3.05-2.90 (m, 4H), 2.87-2.72 (m, 2H), 2.02-1.98 (m, 2H), 1.93 (s, 3H), 1.84-1.81 (m, 1H), 1.79-1.76 (m, 3H), 1.34-1.02 (m, 4H). LC-MS m/z: [M+HCO$_2$-]$^-$=559.

Comparative Example 1: (S)-6-((1-Acetylpiperidin-4-yl)amino)-N-(3-(3,4-dihydroisoquinolin-2(1H)-yl)-2-hydroxypropyl)pyrimidine-4-carboxamide (Compound A)

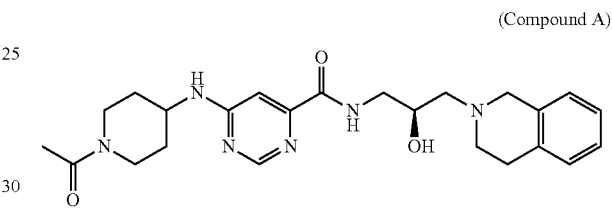

Compound A represented by the above formula was prepared by following the method disclosed for compound 208 in WO2014/100719 (PCT/US2013/077235) and identified by hydrogen spectrum and mass spectrometry.

Comparative Example 2: (R)-7'-((1-Acetylpiperidin-4-yl)amino)-2'-(3-(3,4-dihydroisoquinolin-2(1H)-yl)-2-hydroxypropyl)-2',3'-dihydro-1'H-spiro[cyclopropane-1,4'-isoquinolin]-1'-one (Compound B)

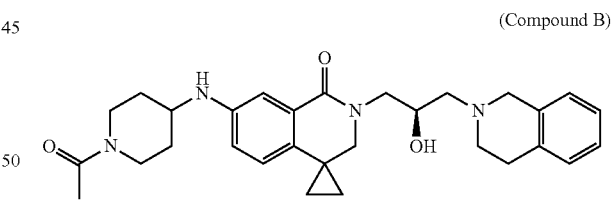

Step 1: Preparation of methyl 2-(1-cyanocyclopropyl)benzoate

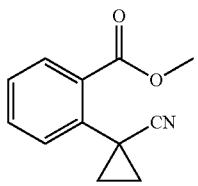

Sodium hydride (4.46 g, 111 mmol) was placed in a three-neck flask. 20 mL of anhydrous N,N-dimethylformamide was added at 0° C. The mixture was stirred for 5 min. Methyl 2-(cyanomethyl)benzoate (7.80 g, 44.6 mmol) in N,N-dimethylformamide (80 mL) was slowly added. The mixture was stirred at 0° C. for 30 min. 1,2-Dibromoethane (10.0 g, 53.5 mmol) was then slowly added dropwise. After the dropwise addition was finished, the mixture was moved to room temperature and reacted for 2 h. After the reaction was complete, it was quenched by adding 20 mL of saturated ammonium chloride solution. The mixture was extracted with ethyl acetate (30 mL×3). The combined organic phase was washed with water (10 mL×2) and saturated brine, dried over anhydrous sodium sulfate, and evaporated under reduced pressure to remove the solvent. The residue was subjected to column chromatography to give the title compound. LC-MS m/z: [M+H]$^+$=202.

Step 2: Preparation of 2',3'-dihydro-1'H-spiro[cyclopropane-1,4'-isoquinolin]-1'-one

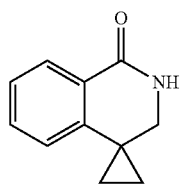

Methyl 2-(1-cyanocyclopropyl)benzoate (13.3 g, 66.1 mmol) was dissolved in 150 mL of absolute ethanol. Cobalt chloride hexahydrate (31.5 g, 132 mmol) was added. Sodium borohydride (7.54 g, 198 mmol) was added in portions at 0° C. The mixture was moved to room temperature and reacted for 1 h and then reacted at 80° C. for 2 h. After the reaction was complete, the mixture was suction filtered, and the filtrate was evaporated under reduced pressure to remove the solvent. The residue was subjected to column chromatography to give the title compound. LC-MS m/z: [M+H]$^+$=174.

Step 3: Preparation of 7'-nitro-2',3'-dihydro-1'H-spiro[cyclopropane-1,4'-isoquinolin]-1'-one

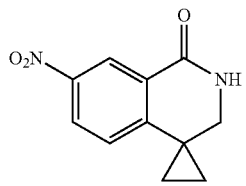

2',3'-Dihydro-1'H-spiro[cyclopropane-1,4'-isoquinolin]-1'-one (6.33 g, 36.6 mmol) was dissolved in concentrated sulfuric acid (30 mL) cooled in an ice bath. Potassium nitrate (3.69 g, 36.6 mmol) was added in portions at −10° C. The mixture was moved to room temperature and reacted for 1 h. After the reaction was complete, the mixture was poured into ice water, at which time a solid was precipitated. The mixture was suction filtered, and the filter cake was dried to give the title compound. LC-MS m/z: [M+H]$^+$=219.

Step 4: Preparation of 7'-amino-2',3'-dihydro-1'H-spiro[cyclopropane-1,4'-isoquinolin]-1'-one

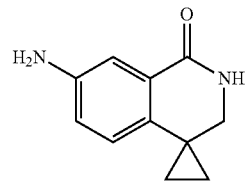

7'-Nitro-2',3'-dihydro-1'H-spiro[cyclopropane-1,4'-isoquinolin]-1'-one (4.57 g, 210 mmol) was dissolved in a mixed solvent of 40 mL of ethanol and 10 mL of water. Iron powder (2.93 g, 52.4 mmol) and ammonium chloride (3.33 g, 62.9 mmol) were added, and the reaction was carried out at 80° C. for 2 h. After the reaction was complete, the mixture was suction filtered. The filtrate was concentrated under reduced pressure, and extracted with dichloromethane (30 mL×3). The combined organic phase was dried over anhydrous sodium sulfate, and evaporated under reduced pressure to remove the solvent. The residue was subjected to column chromatography to give the title compound. LC-MS m/z: [M+H]$^+$=189.

Step 5: Preparation of 7'-((1-acetylpiperidin-4-yl)amino)-2',3'-dihydro-1'H-spiro [cyclopropane-1,4'-isoquinolin]-1'-one

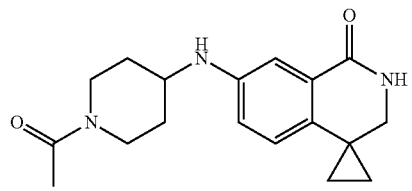 [SMILES: CC(=O)N1CCC(Nc2ccc3c(c2)C(=O)NCC32CC2)CC1]

7'-Amino-2',3'-dihydro-1'H-spiro[cyclopropane-1,4'-isoquinolin]-1'-one (1.55 g, 8.24 mmol) and 1-acetyl-4-piperidinone (1.16 g, 8.24 mmol) were dissolved in 20 mL of methanol. Glacial acetic acid (0.472 mL, 8.24 mmol) was added, and the reaction was carried out at room temperature for 2 h. Borane pyridine complex (1.24 mL, 12.4 mmol) was then slowly added dropwise at 0° C. The mixture was moved to room temperature and reacted for 2 h. After the reaction was complete, the mixture was adjusted to basic pH with saturated sodium bicarbonate solution, and extracted with dichloromethane (20 mL×3). The combined organic phase was dried over anhydrous sodium sulfate, and evaporated under reduced pressure to remove the solvent. The residue was subjected to column chromatography to give the title compound. LC-MS m/z: [M+H]$^+$=314.

Step 6: Preparation of (R)-7'-(1-acetylpiperidin-4-yl)amino)-2'-(3-(3,4-dihydroisoquinolin-2(1H)-yl)-2-hydroxypropyl)-2',3'-dihydro-1'H-spiro[cyclopropane-1,4'-isoquinolin]-1'-one (Compound B)

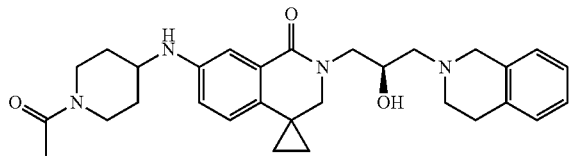 [SMILES: CC(=O)N1CCC(Nc2ccc3c(c2)C(=O)N(C[C@H](O)CN2CCc4ccccc4C2)CC32CC2)CC1]

7'-((1-Acetylpiperidin-4-yl)amino)-2',3'-dihydro-1'H-spiro[cyclopropane-1,4'-isoquinolin]-1'-one (1.56 g, 4.98 mmol) was dissolved in 10 mL of anhydrous N,N-dimethylformamide. Sodium hydride (0.299 g, 7.48 mmol) was added in portions at 0° C. The mixture was stirred for 30 min. (R)-2-(Oxiran-2-ylmethyl)-1,2,3,4-tetrahydroisoquinoline (0.942 g, 4.98 mmol) in N,N-dimethylformamide (5 mL) was added. The mixture was moved to room temperature and reacted overnight. After the reaction was complete, it was quenched by adding 8 mL of saturated ammonium chloride solution. The solvent was evaporated under reduced pressure, and the residue was separated by column chromatography, and then by prep-HPLC (preparative liquid phase chromatography) to give the title compound. $^1$H NMR (400 MHz, DMSO-$d_6$) δ7.16-7.23 (m, 1H), 7.05-7.16 (m, 3H), 6.99-7.05 (m, 1H), 6.65-6.77 (m, 2H), 5.3 (d, 1H), 4.75 (s, 1H), 4.19 (d, 1H), 3.94-4.10 (m, 1H), 3.71-3.87 (m, 2H), 3.62 (s, 2H), 3.42-3.54 (m, 2H), 3.34-3.41 (m, 1H), 3.11-3.25 (m, 2H), 2.75-2.94 (m, 3H), 2.62-2.74 (m, 2H), 2.36-2.48 (m, 2H), 2.00 (s, 3H), 1.79-1.96 (m, 2H), 1.12-1.36 (m, 2H), 0.75-0.97 (m, 4H). LC-MS m/z: $[M+H]^+$=503.

Experimental Example 1: In vitro Evaluation of Kinase Activity of Compounds

1. Experimental Materials

Compounds: the compounds of the present invention prepared in the above examples. Each compound was formulated into a 10 mM stock solution with DMSO, and finally diluted into 10 concentrations for detection, with the final concentrations being 10000.00 nM, 3333.33 nM, 1111.11 nM, 370.37 nM, 123.46 nM, 41.15 nM, 13.72 nM, 4.57 nM, 1.52 nM, and 0.51 nM.

Reagents and consumables: PRMT5, purchased from Active Motif, Cat. No. 31921; polypeptide substrate H4(1-21)S1ac, purchased from Gill Biochemical (Shanghai) Co., Ltd., Cat. No. 342095; [$^3$H]-SAM, purchased From PerkinElmer, Cat. No. NET155V001MC; SAM, purchased from Sigma, Cat. No. A7007-100MG; SAH, purchased from Sigma, Cat. No. A9384-25MG; DTT, purchased from San-gon Bioengineering (Shanghai) Co., Ltd., Cat. No. A620058-0005. Corning-3657, purchased from Corning, Cat. No. 3657; Echo Qualified 384-Well, purchased from Labcyte, Cat. No. P-05525; FlashPlate, purchased from Perkin Elmer, Cat. No. SMP410J001PK.

Instruments: scintillation counter, purchased from PerkinElmer, model MicroBeta2; ultrasonic nanoliter liquid processing system, purchased from Labcyte, model Echo 550.

2. Experimental Method 2.1. Preparation of reaction buffer and reaction stop solution: the composition of 1× reaction buffer was 10 mM Tris-HCl, pH 8.0; 0.01% Tween-20; and 1 mM DTT. The composition of the reaction stop solution was 125 μM $^3$H-SAM solution.

2.2 Formulation of Compounds 2.2.1 Dilution of Compounds

The compounds were dissolved in 100% DMSO to prepare 10 mM stock solutions and then diluted to desired concentrations on an Echo 384 well plate.

2.2.2 Transfer of Compounds to 384 Well Reaction Plate 250 nL of the compounds diluted above were transferred from the Echo 384 well plate to a 384 well reaction plate using the Echo550 instrument.

2.3 Enzymatic Reaction 2.3.1 Preparation of 1.67× Enzyme Solution

PRMT5 was added to 1× reaction buffer to form 1.67× enzyme solution.

2.3.2 Preparation of 2.5× Substrate Solution

The polypeptide substrate and [$^3$H]-SAM were added to 1× reaction buffer to form 2.5× substrate solution (the final concentrations were 100 nM and 250 nM, respectively).

2.3.3 Addition of Enzyme Solution to 384 Well Plate

15 μL of 1.67× enzyme solution was added to the wells of a 384 well reaction plate. For control wells without enzymatic activity, the enzyme solution was replaced with 15 μL of 1× reaction buffer. The plate was centrifuged at 1000 rpm for 1 min and incubated at room temperature for 15 min.

2.3.4 Addition of Substrate Solution to 384 Well Plate to Initiate Enzymatic Reaction 10 μL of 2.5× substrate solution was added to each well of the 384 well reaction plate. The plate was centrifuged at 1000 rpm for 1 min. The reaction was carried out at 25° C. for 60 min.

2.3.5 Termination of Enzymatic Reaction

5 μL of the reaction stop solution was added to each well of the 384 well reaction plate to terminate the reaction. 25 μL was taken from each well of the test plate and transferred to the Flashplate, and placed at room temperature for 1 h. The Flashplate was then washed 3 times with 0.1% Tween-20 solution.

2.4 Reading Data with MicroBeta 2

2.4 Calculation of Inhibition Rate

Data were copied from Microbeta 2, and converted to the inhibition rate data. Among these, the maximum value refers to the conversion rate for the DMSO control, and the minimum value refers to the conversion rate for the control without enzymatic activity. Inhibition rate (%)=(maximum value−sample value)/(maximum value−minimum value)×100%.

The data were imported into GraphPad and a curve fitting was performed using "log(inhibitor) vs. response—Variable slope" to give $IC_{50}$. The $IC_{50}$ results for some compounds are shown in Table 2.

TABLE 2

| Test Compounds | Enzyme $IC_{50}$ (nM) PRMT5 |
|---|---|
| Example 1 | 32.66 |
| Example 2 | 49.70 |
| Example 10 | 2659 |

Experimental Example 2: In vitro Evaluation of Cell Activity of Compounds

1. Experimental Materials

Test compounds: the compounds of the present invention prepared in the above example. Each compound was formulated into a 10 mM stock solution with DMSO, and finally diluted into 8 concentrations for detection, with the final concentrations being 33333.00 nM, 6666.60 nM, 1333.32 nM, 266.66 nM, 53.33 nM, 10.67 nM, 2.13 nM, and 0.43 nM for experiments in Z-138 cells. For experiments in MDA-MB-468 and NCI-H358 cells, the final concentrations of the compounds were 50000 nM, 10000 nM, 2000 nM, 400 nM, 80 nM, 16 nM, 3.2 nM, and 0.64 nM.

Human mantle cell lymphoma cells Z-138, triple negative breast cancer cells MDA-MB-468, and human non-small cell lung cancer cells NCI-H358 were purchased from the American Type Culture Collection (ATCC).

Reagents: Iscove's Modified Dulbecco's Medium (IMEM medium), Cat. No. ATCC 30-2005; Leibovitz's L-15 Medium (L-15 medium), Cat. No. Gibco 11415-064; 1640 Medium, Cat. No. Gibco 22400089; Horse serum, Cat. No. Gibco 16050122; Fetal Bovine Serum, Cat. No. Gibco 10099-141; penicillin-streptomycin, Cat. No. Gibco 15140-122; Sodium pyruvate, Cat. No. Gibco 11360070; CellTiter-Glo Luminescent Cell Viability Assay, Cat. No. Promega G7571. CCK-8 proliferation inhibition Assay Kit, Cat. No. KeyGEN KGA317.

2. Experimental Method 2.1 Cell Thawing:

2.1.1 Z-138 cell thawing: The cryovial for Z-138 cells was taken out from a liquid nitrogen tank and placed in a 37° C. water bath, and shaken gently for thawing as soon as possible. After thawing, the cryovial was taken out, and sterilized with an alcohol cotton ball, after which the cap was unscrewed. The cell fluid was drawn and injected into a centrifuge tube. 1 mL of complete medium containing 10% horse serum was added, and mixed uniformly. The tube was placed in a centrifuge, and centrifuged at 1000 rpm for 5 min. Afterwards, the supernatant was discarded, and complete medium was added. The mixture was pipetted repeatedly until the cells were completely dispersed and resuspended. The mixture was inoculated in a petri dish at an appropriate concentration, and cultured in a $CO_2$ incubator at 37° C., 5% $CO_2$, and 95% humidified air.

2.1.2 MDA-MB-468 cell thawing: The cryovial for MDA-MB-468 cells was taken out from a liquid nitrogen tank and placed in a 37° C. water bath, and shaken gently for thawing as soon as possible. After thawing, the cryovial was taken out, and sterilized with an alcohol cotton ball, after which the cap was unscrewed. The cell fluid was drawn and injected into a centrifuge tube. 1 mL of L-15 medium containing 10% FBS was added, and mixed uniformly. The tube was placed in a centrifuge, and centrifuged at 1000 rpm for 5 min. Afterwards, the supernatant was discarded, and complete medium was added. The mixture was pipetted repeatedly until the cells were completely dispersed and resuspended. The mixture was inoculated in a petri dish at an appropriate concentration, and cultured in a $CO_2$-free incubator at 37° C., and 95% humidified air.

2.1.3 NCI-H358 cell thawing: The cryovial for NCI-H358 cells was taken out from a liquid nitrogen tank and placed in a 37° C. water bath, and shaken gently for thawing as soon as possible. After thawing, the cryovial was taken out, and sterilized with an alcohol cotton ball, after which the cap was unscrewed. The cell fluid was drawn and injected into a centrifuge tube. 1 mL of 1640 medium containing 10% FBS was added, and mixed uniformly. The tube was placed in a centrifuge, and centrifuged at 1000 rpm for 5 min. Afterwards, the supernatant was discarded, and complete medium was added. The mixture was pipetted repeatedly until the cells were completely dispersed and resuspended. The mixture was inoculated in a petri dish at an appropriate concentration, and cultured in a $CO_2$ incubator at 37° C., 5% $CO_2$, and 95% humidified air.

2.2 Cell Culture and Passage:

2.2.1 Z-138 cell culture and passage: The cells grew to about 80-90%. The medium (IMDM medium+10% horse serum+1% penicillin-streptomycin) was transferred to a 15 mL centrifuge tube, and centrifuged at 1000 rpm for 5 min. The supernatant was removed. The cells were resuspended in complete medium, and inoculated in a petri dish at the desired density. The dish was placed in an incubator at 37° C., 5% $CO_2$, and 95% humid air. The culture medium was replenished every 2-3 days or the passage was carried out, depending on the cell growth.

2.2.2 MDA-MB-468 cell culture and passage: The cells grew to about 80-90%. The medium (Leibovitz's L-15 Medium+10% FBS+1% penicillin-streptomycin) was transferred to a 15 mL centrifuge tube, and centrifuged at 1000 rpm for 5 min. The supernatant was removed. The cells were resuspended in complete medium, and inoculated in a petri dish at the desired density. The dish was placed in a $CO_2$-free incubator at 37° C., and 95% humid air. The culture medium was changed every 2-3 days or the passage was carried out, depending on the cell growth.

2.2.3 NCI-H358 cell culture and passage: The cells grew to about 80-90%. The medium (1640 medium+10% FBS+1% penicillin-streptomycin+1 mM sodium pyruvate) was transferred to a 15 mL centrifuge tube, and centrifuged at 1000 rpm for 5 min. The supernatant was removed. The cells were resuspended in complete medium, and inoculated in a petri dish at the desired density. The dish was placed in a $CO_2$ incubator at 37° C., 5% $CO_2$, and 95% humid air. The culture medium was changed every 2-3 days or the passage was carried out, depending on the cell growth.

2.3 Experimental Steps:

On the first day of experiment:

After passage, Z-138 cells were resuspended in complete medium at a density of 1000 cells/well and inoculated in a 96-well culture plate. The 36 wells at the outer circumference of the 96-well plate were filled with 200 μL of PBS to prevent the culture conditions of the inner plate wells from being too different from each other due to the faster evaporation of medium at the edge. The leftmost column of the 60 inner wells were blank wells, which were not added with cells, but filled with equal volume of PBS. The remaining 54 wells were subjected to cell plating with a multichannel pipette, to each well was added 100 μL of culture medium containing corresponding cells. After cell plating was finished, the 96-well plate was tapped to make the cells evenly suspended, and placed in a 5% $CO_2$ incubator and cultured at 37° C. for 24 h.

After passage, MDA-MB-468 cells were resuspended in complete medium at the corresponding density, 2000 cells/well, and inoculated in a 96-well culture plate. The wells at the outer circumference were filled with 200 μL PBS to prevent the culture conditions of the inner plate wells from being too different from each other due to the faster evaporation of medium at the edge. The leftmost column of the 60 inner wells were blank wells, which were not added with cells, but filled with equal volume of PBS. The remaining 54 wells were subjected to cell plating with a multichannel pipette, to each well was added 100 μL. The plate was placed in a $CO_2$-free incubator and cultured at 37° C. for 24 h.

After passage, NCI-H358 cells were resuspended in complete medium at the corresponding density, 1000 cells/well, and inoculated in a 96-well culture plate. The wells at the outer circumference were filled with 200 μL PBS to prevent the culture conditions of the inside plate wells from being too different from each other due to the faster evaporation of medium at the edge. The leftmost column of the 60 inner wells were blank wells, which were not added with cells, but filled with equal volume of PBS. The remaining 54 wells were subjected to cell plating with a multichannel pipette, to each well was added 100 μL. The plate was placed in a 5% $CO_2$ incubator and cultured at 37° C. for 24 h.

On the second day of experiment:

For Z-138 cells, in addition to the original medium (100 μL), 50 μL (3×) of drug was added, and duplicate wells were set for each concentration group. The plate was placed in a $CO_2$ incubator and further cultured for 7 days. The compound was formulated as follows: 1-2 mg of the compound was weighed in advance and formulated into a 10 mM stock solution using DMSO. Complete medium was used to dilute the drug. The final concentrations of the drug included 33333.00 nM as the initial maximum concentration, which was sequentially diluted to 7 gradient concentrations with a 1:4 gradient: 6666.60 nM, 1333.32 nM, 266.66 nM, 53.33 nM, 10.67 nM, 2.13 nM and 0.43 nM. (1) The 10 mM stock solution was 1:4 diluted to corresponding drug solutions, totally 8 concentrations (10 μL stock solution+40 μL DMSO); (2) To 5 μL of the drug of (1) was added 495 μL complete medium to formulate into the corresponding concentration (3×) (100-fold dilution).

For MDA-MB-468 cells, in addition to the original medium (100 μL), 100 μL (2×) of drug was added, and duplicate wells were set for each concentration group. The plate was placed in a $CO_2$-free incubator and further cultured for 7 days. The compound was formulated as follows: 1-2 mg of the compound was weighed in advance and formulated into a 10 mM stock solution using DMSO. Complete medium was used to dilute the drug. The final concentrations of the drug included 50000 nM as the initial maximum concentration, which was sequentially diluted to 7 gradient concentrations with a 1:4 gradient: 50000 nM, 10000 nM, 2000 nM, 400 nM, 80 nM, 16 nM, 3.2 nM and 0.64 nM. (1) The 10 mM stock solution was 1:4 diluted to corresponding drug solutions, totally 8 concentrations (10 μL stock solution+40 μL DMSO); (2) To 5 μL of the drug of (1) was added 495 μL complete medium to formulate into the corresponding concentration (2×) (100-fold dilution).

For NCI-H358 cells, in addition to the original medium (100 μL), 100 μL (2×) of drug was added, and duplicate wells were set for each concentration group. The plate was placed in a 5% $CO_2$ incubator and further cultured for 7 days. The compound was formulated as follows: 1-2 mg of the compound was weighed in advance and formulated into a 10 mM stock solution using DMSO. Complete medium was used to dilute the drug. The final concentrations of the drug included 50000 nM as the initial maximum concentration, which was sequentially diluted to 7 gradient concentrations with a 1:4 gradient: 50000 nM, 10000 nM, 2000 nM, 400 nM, 80 nM, 16 nM, 3.2 nM and 0.64 nM. (1) The 10 mM stock solution was 1:4 diluted to corresponding drug solutions, totally 8 concentrations (10 μL stock solution+40 μL DMSO); (2) To 5 μL of the drug of (1) was added 495 μL complete medium to formulate into the corresponding concentration (2×) (100-fold dilution).

On the eighth day of experiment:

After Z-138 cells were treated with drugs for 7 days, the CellTiter-Glo Luminescent Cell Viability Assay was taken out 30 minutes in advance and equilibrated to room temperature. For the blank wells, PBS was drawn out and discarded, and 150 μL of complete medium was added. Then, 75 μL of Celltiter-Glo reagent was added to blank wells, dosing wells and DMSO wells, and shaken at room temperature for 2 min. After further incubating at room temperature for 10 min, 180 μL was drawn from each well and transferred to an opaque blank plate. After removing air bubbles, the chemiluminescence signal was detected. The sample was shaken. The injection and detection condition for Read was 500 ms. Based on the A.U. values exported from the microplate reader, the inhibition rate for each well relative to the solvent control well was calculated: Inhibition (%)=100−($A.U._{Experimental\ Well}$−$A.U._{Blank\ Well}$)/($A.U._{Solvent\ Control\ Well}$−$A.U._{Blank\ Well}$)*100. According to different drug concentrations and their corresponding inhibition rates, the $IC_{50}$ curve was plotted and the data were analyzed using GraphPad 5.0 software to give the final $IC_{50}$ values. The experimental results are shown in Table 3.

After MDA-MB-468 and NCI-H358 cells were treated with drugs for 7 days, the medium in the wells was drawn out and discarded, and 100 μL of complete medium supplemented with CCK-8 (CCK-8: complete medium=1:10) was added. The first column of PBS was used as a blank control well, and 100 μL of CCK-8 was added synchronously thereto. The plate was then placed in an incubator and cultured for about 40 min-2 h. The optimal detection time was determined according to the shade of color developed by CCK-8 (the optimal OD value for the DMSO group was about 1.0). When orange color was developed by CCK-8 and showed a certain gradient that can be distinguished by naked eyes, the 96-well plate was taken out of the incubator and placed at room temperature to equilibrate for 5-10 minutes. The microplate reader software was opened, the detection parameters were adjusted, and the absorbance at 450 nm (OD value) was detected. The cover of the culture plate was removed, and the culture plate was directly placed horizontally in the plate groove to start reading. After the reading was finished, the program was saved, and the data was exported. The software was closed and the computer was shut down. Based on the OD values exported from the microplate reader, the inhibition rate for each well relative to the solvent control well was calculated: Inhibition (%)=100−($OD_{Experimental\ Well}$−$OD_{Blank\ Well}$)/($OD_{Solvent\ Control\ Well}$−$OD_{Blank\ Well}$)*100. According to different drug concentrations and their corresponding inhibition rates, the $IC_{50}$ curve was plotted and the data were analyzed using GraphPad 5.0 software to give the final $IC_{50}$ values. The experimental results are shown in Table 3.

TABLE 3

| Test Compounds | Types of Cells $IC_{50}$ (nM) | | |
| --- | --- | --- | --- |
| | Z-138 Cell | MDA-MB-468 Cell | NCI-H358 Cell |
| Example 1 | 3.07 | 11.57 | 8.90 |
| Example 2 | 2.20 | 7.35 | 5.02 |
| Compound A | 19.49 | 116.00 | 73.20 |
| Compound B | 4.33 | 41.28 | 15.35 |

It can be seen from the above experiments that the compounds of the present invention show good inhibitory activities on human mantle cell lymphoma cells Z-138, triple negative breast cancer cells MDA-MB-468 and human non-small cell lung cancer cells NCI-H358, and are very promising to become a therapeutic agent for lymphoma, triple-negative breast cancer, and non-small cell lung cancer.

Experimental Example 3: Electrophysiological Manual Patch-Clamp Detection of the Effect of Compounds on hERG Potassium Channel The hERG potassium channel is the standard for drug safety screening. Blockade of the hERG potassium channel can lead to cardiotoxicity and prolonged ventricular repolarization, which may lead to sudden death in severe cases. Drugs with inhibitory effects on the hERG potassium channel may be a potential scourge for clinical use. Therefore, compounds with weak inhibitory effects on the hERG potassium channel have high safety. Drug-induced prolongation of QT interval is associated with an increased risk of fatal ventricular arrhythmias and sudden death.

1. Experimental Materials

Main reagents: penicillin-streptomycin solution (100×), and DMEM/F12 were purchased from Gibco; fetal bovine serum was purchased from PAA; DMSO, EGTA, and MgATP were purchased from Sigma; KCl, $CaCl_2 \cdot 2H_2O$, $MgCl_2 \cdot 6H_2O$, and NaCl were purchased from Sinopharm; glucose was purchased from General-reagent; HEPES was purchased from Solarbio; and quinidine was purchased from aladdin.

Instruments: TI-S-FLU microscope was purchased from Nikon; SMZ-140/143 microscope was purchased from Motic; EPC-10 amplifier, and Patchmaster V2X60 were purchased from HEKA; TMC-36 shock-proof platform was purchased from TMC; MP-225, MPC-200 manipulator, ROE-200 micromanipulator, and P-97 electrode drawing instrument were purchased from Sutter; and VC3-8PP irrigation delivery system was purchased from ALA.

2. Experimental Method

Preparation of test solvents: preparation of extracellular fluid (mM): 137 NaCl, 4 KCl, 1.8 $CaCl_2$, 1 $MgCl_2$, 10 glucose and 10 HEPES (pH 7.4); preparation of intracellular fluid (mM): 130 KCl, 1 $MgCl_2$, 5 EGTA, 5 MgATP and 10 HEPES (pH 7.2); preparation of negative control: extracellular fluid+0.3% DMSO; positive control: quinidine.

Compound treatment: The compound was weighed and dissolved in DMSO to prepare a 10 mM stock solution, which was diluted with DMSO to form secondary stock solutions with concentrations of 3.3, 1.1, 0.37 and 0.12 mM. 90 μL each of the stock solution and the secondary stock solutions was diluted into 30 mL of extracellular fluid for electrophysiological detection. The final concentrations of the compound were 30, 10, 3.3, 1.1 and 0.37 μM, and the final concentration of DMSO was 3:1000.

Stably transfected cell culture: The cell line was originated from HEK-293 cells overexpressing hERG potassium ion channel. It was established and verified by PharmaCore Labs Co., Ltd in cooperation with and technically supported by the laboratory of Dr. Mohamed Boutjdir at New York University School of Medicine. The cells were cultured in an incubator at 37° C. and 5% $CO_2$. When the cell density reaches 80% of the petri dish, the cells were first pre-washed with phosphate buffered saline (PBS), then digested with trypsin/EDTA for 2-3 min. Cell culture medium was added to stop the digestion. The cells were gently blown down and transferred to a centrifuge tube, and centrifuged at 1000 rpm for 3 min. The supernatant was discarded, cell culture medium was added, and the cells were mixed uniformly by gentle tapping. After that, the mixture was transferred to a petri dish for subculture, or the cells were dripped on a round glass slide and placed on a petri dish for the cells to adhere for experiments.

Composition of cell culture medium: DMEM, 15% fetal bovine serum and 1% 100×penicillin-streptomycin.

Experiments on electrophysiological manual patch-clamp system: The stably transfected cells were inoculated on a glass slide with a cell density lower than 50%, and cultured overnight. The experimental cells were transferred to a bath of about 1 mL embedded in an inverted microscope platform, and the extracellular fluid was perfused at a perfusion rate of 2.7 mL/min. After 5 minutes of stabilization, the experiment was started. Membrane currents were recorded using HEKA EPC-10 patch clamp amplifier and PATCHMASTER acquisition system. All the experiments were performed at room temperature (22-24° C.). Electrodes were drawn straight using P-97 microelectrode drawing instrument (BF150-110-10) in the experiments. The inner diameter of the electrode was 1-1.5 mm, and the pipette resistance after filling with the inner liquid was 2-4 MΩ. The electrophysiological stimulation scheme of hERG potassium channel included: first setting the membrane voltage at −80 mV, applying a stimulation to the cells at +20 mV voltage for 2 s to activate the hERG potassium channel, and then repolarizing to −50 mV for 5 s to generate an outward tail current. The stimulation frequency was once every 15 s. The current value was the peak value of the tail current. The channel currents were recorded in the whole-cell recording mode. Firstly, the extracellular fluid was perfused (about 2 mL per minute) while recording was continued. When the current was stabilized (the current decay (Run-Down) was less than 5% within 5 minutes), the peak value of the tail current was the control current value. Then, the extracellular fluid containing the drug to be tested was perfused while the recording was continued until the inhibitory effect of the drug on the hERG current reached a steady state. At this time, the peak value of the tail current was the current value after drug addition. The standard for the steady state was judged by whether the last three consecutive current recording curves overlapped. After the steady state was reached, if, after the cells were perfused and flushed with the extracellular fluid, the hERG current resumed or approached the value before the drug was added, the perfusion test could be continued with other concentrations or drugs. 30 μM quinidine was used in the experiments as a positive control to ensure that the cells used were responding properly.

3. Parametric Analysis and Data Analysis and Statistics

In this study, by measuring the maximum current value for the control group and the drug treatment group, the ratio of the maximum current value for the treatment group to the maximum current value for the control group was calculated to evaluate the effect of the test compound on the hERG potassium ion channel at the test concentration (Mean±SE).

The experimental data were collected by PATCHMASTER V2X60, and analyzed and counted by Origin 8.5 software and Microsoft Excel. The experimental results are shown in Table 4.

TABLE 4

| Test Compounds | hERG $IC_{50}$ (μM) |
|---|---|
| Example 1 | 5.24 |
| Example 2 | 15.07 |
| Compound B | 2.71 |

It can be seen from the above experiments that the compounds of Examples 1 and 2 of the present invention have weak inhibitory effect on the hERG potassium channel and low toxicity to the heart, and are superior to Compound B.

In addition, Compound B showed a significant prolongation of the QT interval in ex vivo heart experiments, while the compounds of Examples 1 and 2 of the present invention showed no effect on the QT interval in ex vivo heart experiments. The compounds of the present invention have better heart safety.

Although the present invention has been described above in detail, it will be understood by a person skilled in the art that various modifications and variations can be made to the present invention without departing from the spirit and scope of the invention. The scope of the rights of the present invention is not limited to the above detailed description, but should be subject to the claims.

The invention claimed is:

1. A compound of general formula (A), or an isomer, pharmaceutically acceptable salt, solvate, or crystal thereof,

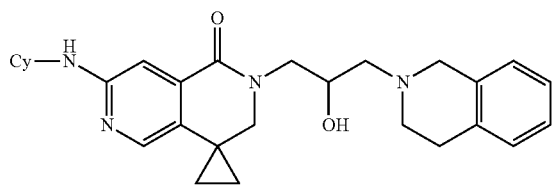

(A)

wherein

Cy is selected from 3-12 membered heterocyclyl, which may be substituted by one or more groups selected from the group consisting of halogen, hydroxyl, $C_{1-6}$alkyl, nitro, cyano, amino, $C_{3-8}$cycloalkyl, 3-8 membered heterocyclyl and oxo.

2. A pharmaceutical composition comprising the compound according to claim 1, or an isomer, pharmaceutically acceptable salt, solvate, or crystal thereof, and a pharmaceutically acceptable carrier.

3. A method of treating a PRMT5 mediated disease, comprising administering to a patient in need thereof a therapeutically effective amount of the compound according to claim 1, or an isomer, pharmaceutically acceptable salt, solvate, or crystal thereof, wherein the PRMT5 mediated disease is acute lymphoblastic leukemia, breast cancer or non-small cell lung cancer.

4. A compound of general formula (I), or an isomer, pharmaceutically acceptable salt, solvate, or crystal thereof,

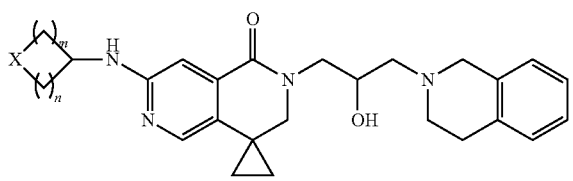

(I)

wherein

X is selected from the group consisting of O, S, C($R^1$)($R^2$) and N($R^3$), wherein $R^1$, $R^2$ and $R^3$ are each independently selected from the group consisting of hydrogen, halogen, hydroxyl, $C_{1-6}$alkyl, halo$C_{1-6}$alkyl, hydroxy$C_{1-6}$alkyl, $C_{1-6}$alkoxy, halo$C_{1-6}$alkoxy, hydroxy$C_{1-6}$alkoxy, nitro, carboxyl, cyano, amino, mono-$C_{1-6}$alkylamino, $C_{1-6}$alkylacylamino, $C_{1-6}$alkylacyl, aminoacyl, $C_{1-6}$alkylaminoacyl, di-$C_{1-6}$alkylamino and $C_{3-12}$cycloalkyl, and $R^1$ and $R^2$ together with the carbon atom to which they attach form 3-6 membered heterocyclyl, which further comprises one or more heteroatoms selected from the group consisting of N, O and S, and is optionally substituted by one or more groups selected from the group consisting of halogen, hydroxyl, $C_{1-6}$alkyl, halo$C_{1-6}$alkyl, hydroxy$C_{1-6}$alkyl, $C_{1-6}$alkoxy, halo$C_{1-6}$alkoxy, hydroxy$C_{1-6}$alkoxy, nitro, carboxyl, cyano, amino, mono-$C_{1-6}$alkylamino, $C_{1-6}$alkylacylamino, $C_{1-6}$alkylacyl, aminoacyl, $C_{1-6}$alkylaminoacyl, di-$C_{1-6}$alkylamino and $C_{3-12}$cycloalkyl;

m is 1, 2, 3 or 4; and n is 0, 1, 2, 3 or 4.

5. The compound according to claim 4, or an isomer, pharmaceutically acceptable salt, solvate, or crystal thereof, wherein the general formula (I) has the structure of the following general formula (Ia),

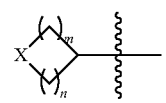

(Ia)

wherein X, m and n have the definitions described in claim 4.

6. The compound according to claim 4, or an isomer, pharmaceutically acceptable salt, solvate, or crystal thereof, wherein

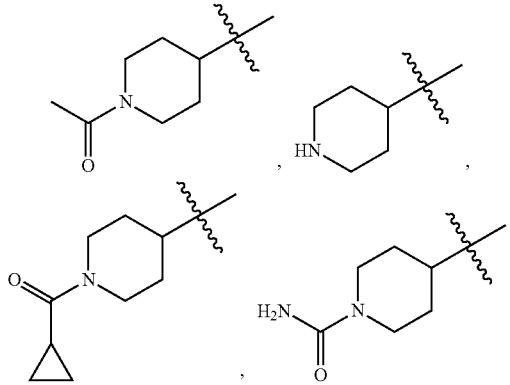

is selected from the group consisting of

-continued

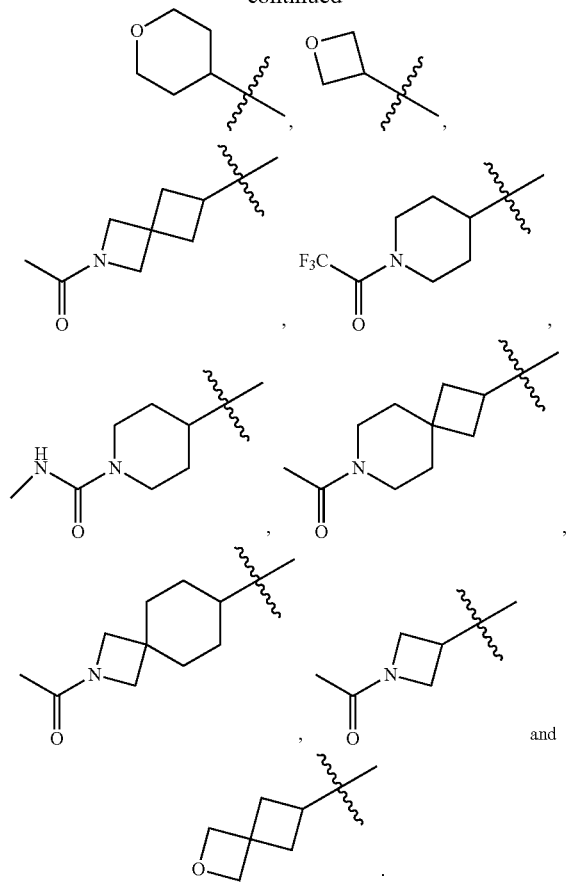

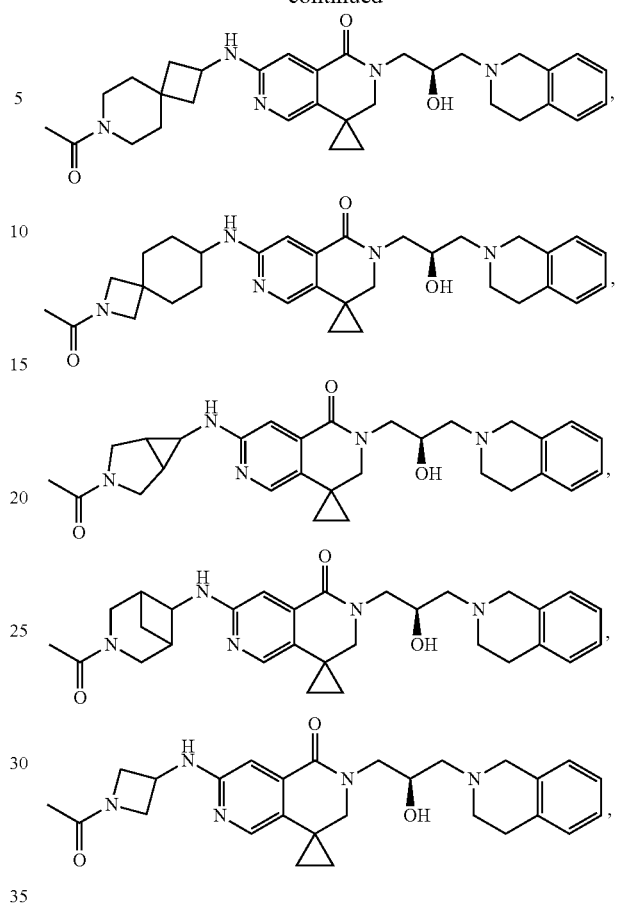

-continued

7. A pharmaceutical composition comprising the compound according to claim 4, or an isomer, pharmaceutically acceptable salt, solvate, or crystal thereof, and a pharmaceutically acceptable carrier.

8. A method of treating a PRMT5 mediated disease, comprising administering to a patient in need thereof a therapeutically effective amount of the compound according to claim 4, or an isomer, pharmaceutically acceptable salt, solvate, or crystal thereof, wherein the PRMT5 mediated disease is acute lymphoblastic leukemia, breast cancer or non-small cell lung cancer.

9. A compound, or an isomer, pharmaceutically acceptable salt, solvate, or crystal thereof, wherein the compound is selected from the group consisting of:

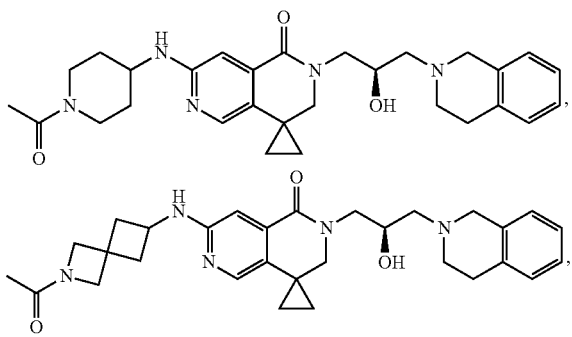

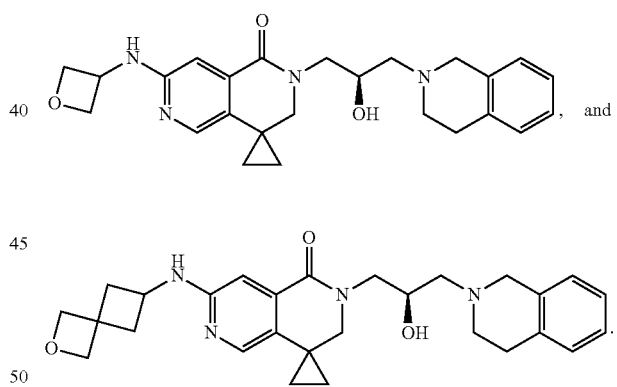

10. A pharmaceutical composition comprising the compound according to claim 9, or an isomer, pharmaceutically acceptable salt, solvate, or crystal thereof, and a pharmaceutically acceptable carrier.

11. A method of treating a PRMT5 mediated disease, comprising administering to a patient in need thereof a therapeutically effective amount of the compound according to claim 9, or an isomer, pharmaceutically acceptable salt, solvate, or crystal thereof, wherein the PRMT5 mediated disease is acute lymphoblastic leukemia, breast cancer or non-small cell lung cancer.

* * * * *